United States Patent
Sasaki

(10) Patent No.: US 6,654,555 B2
(45) Date of Patent: Nov. 25, 2003

(54) ENGAGEMENT STRUCTURE FOR CYLINDRICAL MEMBERS

(75) Inventor: Takamitsu Sasaki, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/985,747

(22) Filed: Nov. 6, 2001

(65) Prior Publication Data
US 2002/0054760 A1 May 9, 2002

(30) Foreign Application Priority Data
Nov. 7, 2000  (JP) .......................... 2000-338966

(51) Int. Cl.⁷ .................. G03B 17/00; G02B 15/14; G02B 7/02
(52) U.S. Cl. ..................... 396/72; 359/700; 359/822
(58) Field of Search ............... 396/72, 73, 74, 396/75; 359/699, 700, 701, 822

(56) References Cited

U.S. PATENT DOCUMENTS 5,956,189 A  *  9/1999  Azegami et al. ............ 359/823
6,014,269 A     1/2000  Nomura et al.

FOREIGN PATENT DOCUMENTS

JP          11133285        5/1999

* cited by examiner

Primary Examiner—Russell Adams
Assistant Examiner—Arthur A Smith
(74) Attorney, Agent, or Firm—Greenblum & Bernstein, P.L.C.

(57) ABSTRACT

An engagement structure for cylindrical members includes a first cylindrical member including a plurality of engagement projection portions of different shapes having the same projecting length in the radial direction, and a second cylindrical member including a plurality of groove portions corresponding to the engagement projection portions, each the groove portions having at least one groove, wherein one of the first and second cylindrical members is accommodated inside the other of the first and second cylindrical members. The engagement projection portions and the corresponding groove portions can be engaged and disengaged only at one relative circumferential position of the first and second cylindrical members, and at a relative circumferential position other than the one relative circumferential position, the engagement projection portions of the first cylindrical member are always engaged with at least a portion of the groove portions other than the grooves thereof.

32 Claims, 19 Drawing Sheets

0° Rotation

120° Rotation

240° Rotation

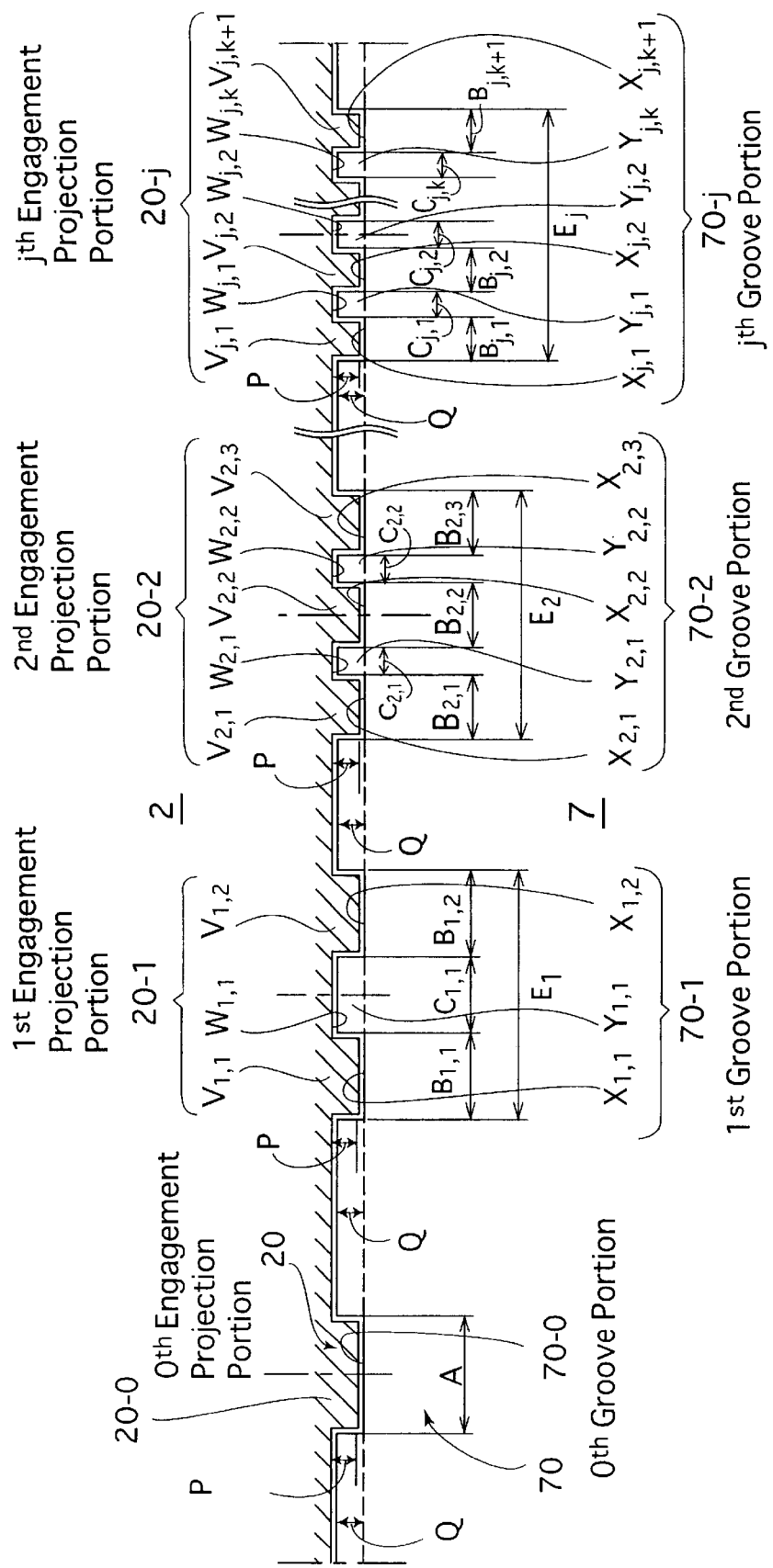

ENGAGEMENT STRUCTURE FOR CYLINDRICAL MEMBERS

BACKGROUND OF THE INVENTION

1. Field of the Invention

The present invention relates to an engagement structure for disengageably and rotatably engaging a pair of cylindrical members, such as lens barrels of a camera.

2. Description of the Related Art

In a known engagement structure to connect (or fit) a pair of cylindrical members having different diameters, such as zoom lens barrels of a camera so as to be disengageable from one another in the axial direction and relatively rotatable in the circumferential direction, one of the cylindrical members which is provided with radially extending portions (which will be referred to as projections or engagement projection portions) that are inserted in grooves provided in a flange of the other cylindrical member, so that the engagement projection portions are rotatable in a plane of the flange.

In the above engagement structure, the amount of relative rotation (angular displacement) of the cylindrical members is determined in accordance with the number of the engagement projection portions or grooves. If the cylindrical members have a single engagement projection and a single groove, respectively, the cylindrical members are relatively rotatable over approximately 360 degrees. However, in this engagement structure, the flange is only supported by the single projection and, hence, the engagement is not stable.

To solve this problem, it is possible to provide, for example, three engagement projection portions which are spaced at equal angular pitches (e.g., 120 degrees). An increase in the number of the engagement projection portions, i.e., number of the supporting portions, contributes to a stable relative rotation of the cylindrical members. However, the maximum relative angular displacement is remains at approximately 120 degrees.

In a lens barrel arrangement, it is preferable that the angular displacement of the cylindrical members be as large as possible to increase the axial displacement of the lens at each mode of use and to provide a sufficient angular displacement from a use position to a disassembling position.

Under these circumstances, in an arrangement having three pairs of engagement projection portions $A_1$ through $A3$ and grooves $B_1$ through $B3$, as shown in FIG. 25, it is possible to space at least one engagement projection portion $A2'$ and groove $B2'$ from the remaining engagement projection portions and grooves at an angular distance different from the angular distance (120 degrees) between the remaining engagement projection portions and grooves, to thereby increase the angular displacement of the cylindrical members, instead of the equal pitch arrangement of the three pairs of the engagement projection portions and grooves.

However, in this solution, the supporting portions are not uniformly distributed, thus resulting in less stability during rotation or less efficiency of assembling and disassembling operations. Moreover, when the cylindrical members are rotated, for example, a first engagement projection reaches the groove for the second or third engagement projection, and the first engagement projection is disengaged at this moment, thus leading to insufficient stability.

To eliminate these problems, in Japanese Kokai Publication No. 11-133285, the engagement projection portions and grooves are disclosed as having different lengths in the circumferential direction and in the radial direction. With this arrangement, the engagement projection portions are allowed to be disengaged only at the corresponding grooves. However, it is necessary for the cylindrical members to have play in the length thereof in the radial direction.

SUMMARY OF THE INVENTION

It is an object of the present invention to provide an engagement structure for cylindrical members, which can be made small and in which the angular displacement of the cylindrical members can be increased even if there is no play in the radial length thereof, so that it is difficult to make the length of the engagement projection portions different, the stability of the cylindrical members during rotation thereof can be improved, and the assembling and disassembling operations of the cylindrical members can be easily carried out.

According to an aspect of the present invention, an engagement structure for cylindrical members is provided, including a first cylindrical member including a plurality of engagement projection portions of different shapes having the same projecting length in the radial direction, and a second cylindrical member including a plurality of groove portions corresponding to the engagement projection portions, each the groove portions having at least one groove; wherein one of the first and second cylindrical members is accommodated inside the other of the first and second cylindrical members. The engagement projection portions and the corresponding groove portions can be engaged and disengaged only at one relative circumferential position of the first and second cylindrical members; and at a relative circumferential position other than the one relative circumferential position of the first and second cylindrical members, the engagement projection portions of the first cylindrical member are always engaged with at least a portion of the groove portions other than the grooves thereof.

In an embodiment, the overall lengths of the engagement projection portions in the circumferential direction are different from each other, and the overall lengths of the groove portions in the circumferential direction are different from each other.

In an embodiment, the engagement projection portions and the groove portions are formed so that the overall length in the circumferential direction of each engagement projection portion and groove portion is gradually increased.

In an embodiment, the engagement projection portions, excluding one engagement projection portion, are each provided with a pair of right and left projections which are spaced by a groove in the circumferential direction; and wherein the groove portions, excluding one groove portion, are each provided with a pair of right and left grooves which are spaced by a projection in the circumferential direction.

In an embodiment, the grooves of the engagement projection portions have different circumferential lengths, and the projections of the groove portions have different circumferential lengths.

In an embodiment, the groove portions satisfy the following conditions:

$A > B_j$;

$A > D_j$;

$A < E_j$;

$C_j < C_{j+1}$;

$E_j < E_{j+1}$;

wherein "A" designates the circumferential length of the groove portion having no projection, $B_j$ and $D_j$ designate the circumferential lengths of the grooves of the j-th groove portion, $C_j$ designates the circumferential length of the projection of the j-th groove portion, and $E_j$ designates the overall length of the j-th groove portion.

In an embodiment, the engagement projection portions satisfy the following conditions:

$A > B_j$;

$A > D_j$;

$A < E_j$;

$C_j < C_{j+1}$;

$E_j < E_{j+1}$;

wherein "A" designates the circumferential length of the engagement projection portion having no groove; $B_j$ and $D_j$ designate the circumferential lengths of the projections of the j-th engagement projection portion; $C_j$ designates the circumferential length of the groove of the j-th engagement projection portion; and $E_j$ designates the overall length of the j-th engagement projection portion.

Furthermore, in an embodiment, the following conditions are satisfied:

$B_j = B_{j+1}$; and $D_j = D_{j+1}$.

In an embodiment, the following condition is satisfied:

$B_j = D_j$.

Preferably, one of the cylindrical members is a cam ring which is adapted to move a lens barrel of a camera, and the other cylindrical member is a linear movement guide ring which is adapted to guide a linear movement of a lens support cylinder which is rotatably supported by the cam ring and is moved linearly in an optical axis direction in accordance with the rotation of the cam ring.

In another aspect of the present invention, the grooves of the engagement projection portions are located at different positions.

In an embodiment, the following condition is satisfied:

$E_j = E_{j+1}$;

wherein $E_j$ designates the overall length of the j-th groove portion or the overall length of the j-th engagement projection portion.

In an embodiment, the groove portions satisfy the following conditions:

$A > B_j$;

$A > D_j$;

$A < E_j$; and $B_j < B_{j+1}$;

wherein "A" designates the circumferential length of the groove portion having no projection, $B_j$ designates the circumferential length of a first groove of the j-th groove portion, $D_j$ designates the circumferential length of a second groove of the j-th groove portion, and $E_j$ designates the overall length of the j-th groove portion.

In an embodiment, the engagement projection portions satisfy the following conditions:

$A > B_j$;

$A > D_j$;

$A < E_j$; and $B_j < B_{j+1}$;

wherein "A" designates the circumferential length of the engagement projection portion having no groove, $B_j$ designates the circumferential length of a first projection of the j-th engagement projection portion, $D_j$ designates the circumferential length of a second projection of the j-th engagement projection portion, and $E_j$ designates the overall length of the j-th engagement projection portion.

In an embodiment, the following condition is satisfied:

$E_j = E_{j+1}$.

In an embodiment, the following condition is satisfied:

$C_j = C_{j+1}$;

wherein $C_j$ designates the circumferential length of the groove of the j-th engagement projection portion or the circumferential length of the projection of the j-th groove portion.

In an embodiment, one of the cylindrical members is a cam ring which is adapted to move a lens barrel of a camera, and the other cylindrical member is a lens support cylinder which is rotatably supported by the cam ring and is moved linearly in an optical axis direction in accordance with the rotation of the cam ring.

In another aspect of the present invention, the engagement projection portions have different numbers of grooves.

In an embodiment, the following condition is satisfied:

$E_j \neq E_{j+1}$;

wherein $E_j$ designates the overall length of the j-th groove portion or the overall length of the j-th engagement projection portion.

In an embodiment, the projections of the groove portions have different circumferential lengths.

In an embodiment, the grooves of the engagement projection portions have different circumferential lengths.

In an embodiment, the engagement projection portions and the groove portions of the cylindrical members are arranged so that the overall lengths thereof in the circumferential direction gradually increase.

In an embodiment, the following conditions are satisfied:

$A > B_{j,k}$; and $B_{j,k} > B_{j+1,k}$;

wherein "A" designates the circumferential length of the groove portion having no projection, and $B_{j,k}$ designates the circumferential length of a k-th groove of a j-th groove portion.

In an embodiment, the following conditions are satisfied:

$A > B_{j,k}$; and $B_{j,k} > B_{j+1,k}$;

wherein "A" designates the circumferential length of the engagement projection portion having no groove, and $B_{j,k}$ designates the circumferential length of a k-th projection of a j-th engagement projection portion.

In an embodiment, the following condition is satisfied:

$$B_{j,k}=B_{j,k+1};$$

wherein $B_{j,k}$ designates the circumferential length of a k-th groove of a j-th groove portion or the circumferential length of a k-th projection of a j-th engagement projection portion.

In an embodiment, the following condition is satisfied:

$$C_{j,k}>C_{j+1,k};$$

wherein $C_{j,k}$ designates the circumferential length of the projection provided between the k-th and (k+1)-th grooves of the j-th groove portion.

In an embodiment, the following condition is satisfied:

$$C_{j,k}>C_{j+1,k};$$

wherein $C_{j,k}$ designates the circumferential length of the groove provided between the k-th and (k+1)-th projection of the j-th engagement projection portion.

In an embodiment, one of the cylindrical members is a cam ring which is adapted to move a lens barrel of a camera, and the other cylindrical member is a lens support cylinder which is rotatably supported by the cam ring and is moved linearly in an optical axis direction in accordance with the rotation of the cam ring.

The present disclosure relates to subject matter contained in Japanese Patent Application No.2000-338966 (filed on Nov. 7, 2000) which is expressly incorporated herein by reference in its entirety.

BRIEF DESCRIPTION OF THE DRAWINGS

The present invention will be described below in detail with reference to the accompanying drawings in which:

FIG. 19 is an explanatory view showing a positional relationship between engagement projection portions of a cam ring and grooves of a linear movement guide ring, in a third embodiment of an engagement structure of the present invention;

DESCRIPTION OF THE PREFERRED EMBODIMENTS

Embodiments of the present invention will be discussed below with reference to the accompanying drawings.

Figure 1:
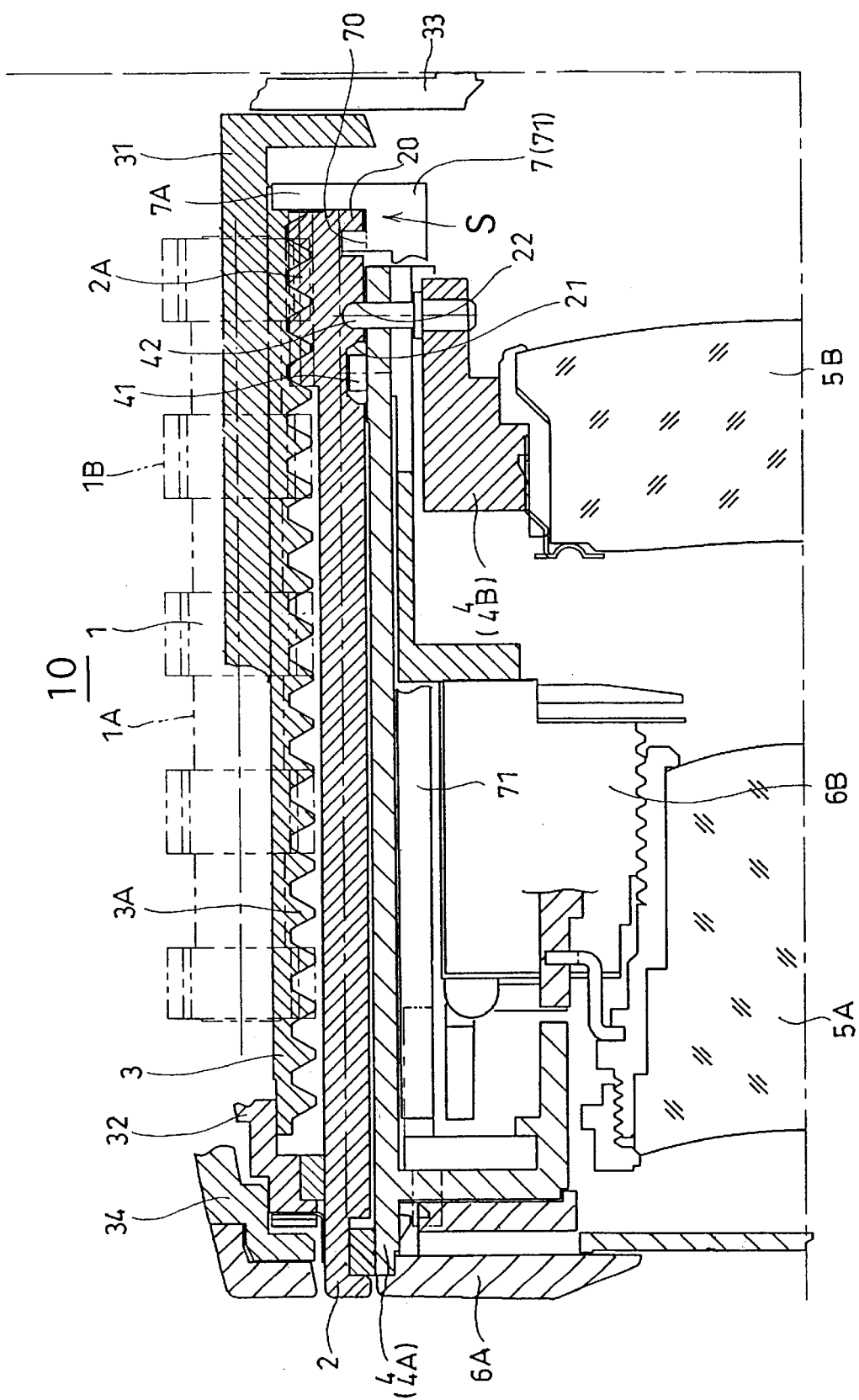
FIG. 1 is a sectional view of a lens barrel to which an engagement structure of the present invention is applied.

FIG. 1 shows an engagement structure of cylindrical members according to the present invention. In a lens barrel 10 which will be discussed in detail hereinafter, an engagement structure "S" using engagement projection portions is employed between a cam ring (cylindrical member) 2 and a linear movement guide ring (cylindrical member) 7 on the lens support cylinder 4 side.

In this embodiment, the discussion will be addressed first to the lens barrel 10. The lens barrel 10 essentially includes a multiple pinion 1, a cam ring 2 which is in mesh with the multiple pinion 1 and is fed forward when rotated, a helicoid ring 3 which rotatably supports the cam ring 2 at a predetermined position, and a lens support ring 4 which is moved linearly in the axial direction in accordance with the rotation of the cam ring 2. In FIG. 1, 5A represents a front lens group, 5B represents a rear lens group, 6A represents a decorative plate, and 6B represents a shutter unit.

Figure 2:
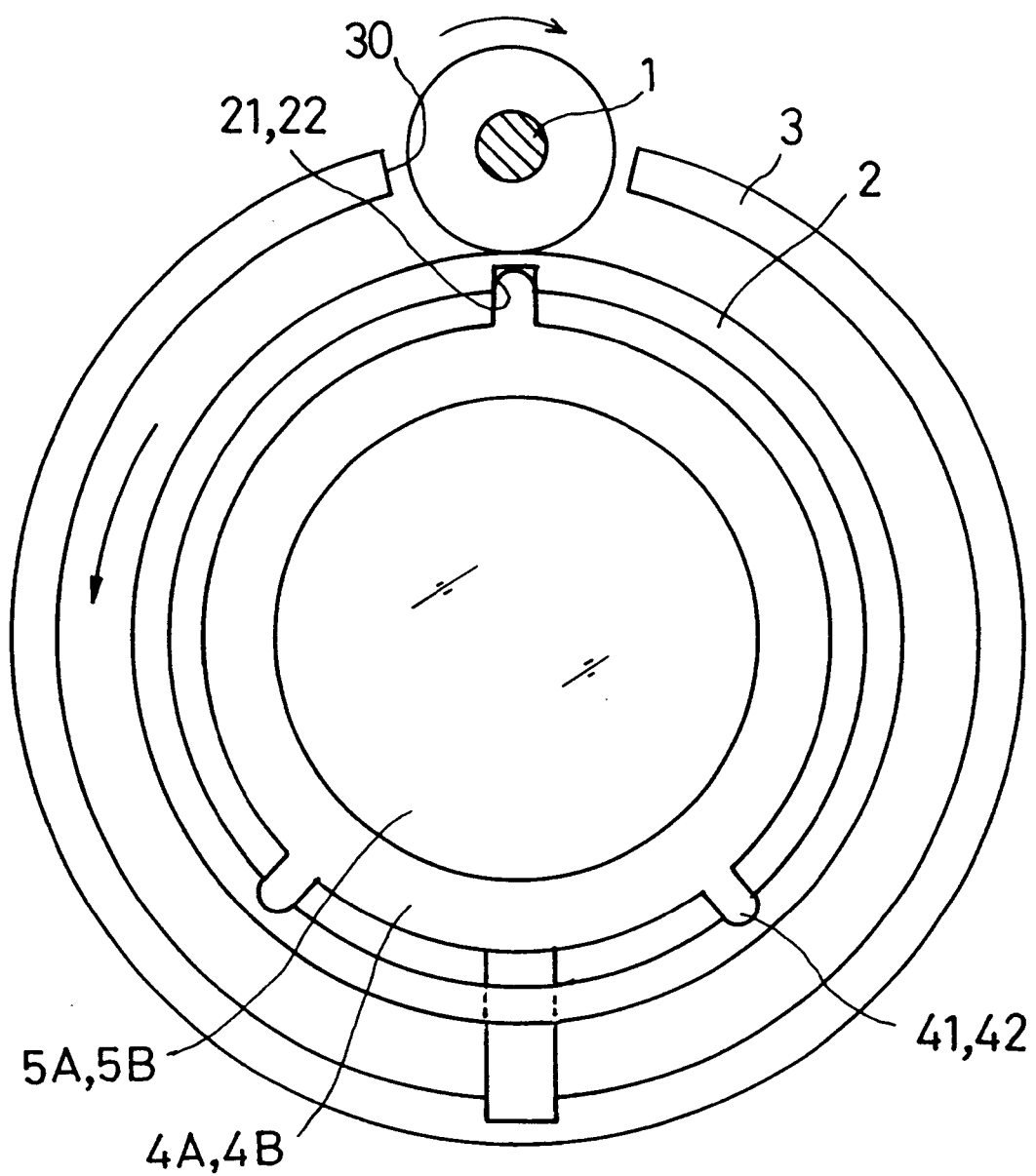
FIG. 2 is an explanatory view showing the principle of the operation of a lens barrel shown in FIG. 1.

The multiple pinion 1 is rotatably attached to a camera body at a predetermined position and is driven and rotated by a motor (not shown) through a reduction gear train. The multiple pinion 1 is provided with a plurality of pinions 1B secured to a rotating shaft 1A which extends in parallel with the axis of the cam ring 2. The multiple pinion 1 is inserted in an opening 30 formed by partly cutting away the helicoid ring 3, as shown in FIG. 2, so that the multiple pinion 1 is rotated at a fixed position.

The cam ring 2 is provided on the entire outer peripheral surface at an edge thereof with a multiple thread (external thread) 2A which is in mesh with the multiple pinion 1. To transfer the lens barrel 10 from a lens accommodation position (retracted position) shown in FIG. 4 to a wide mode position shown in FIG. 5 or a telephoto mode position shown in FIG. 6, the cam ring 2 is moved in the axial direction in accordance with the rotation of the pinions 1B of the multiple pinion 1 while being guided by the helicoid ring 3. The cam ring 2 is provided on its inner peripheral surface with helical cam grooves 21 and 22 in which front and rear rollers 41 and 42 of the lens support cylinder 4 are engaged.

The helicoid ring 3 is adapted to guide the rotational and axial movements of the cam ring 2 and is secured to a stationary barrel 31 of the camera body. The helicoid ring 3 is provided on its entire inner peripheral surface with a multiple thread (internal thread) 3A which is in mesh with the external multiple thread 2A of the cam ring 2. The helicoid ring 3 is held between an adjustment ring 32 at the front end and a camera body aperture 33 at the base end adjacent to the stationary barrel 31, 50 as not to move in the axial direction. The stationary barrel 31 is adapted to support and secure the helicoid ring 3 to the camera body. The adjustment ring 32 is adapted to move the helicoid ring 3 in the axial direction to thereby carry out a backfocus adjustment. Specifically, the adjustment ring 32 and the helicoid ring 3 are screw-engaged, so that when the adjustment ring 32 is rotated, the members located on the inner side with respect to the helicoid ring 3 are moved in the optical axis direction to carry out the backfocus adjustment. A linear guide (not shown) is provided on the inner periphery of the helicoid ring 3.

The lens support cylinder 4 includes a front lens cylinder 4A which supports the front lens group 5A and a rear lens cylinder 4B which supports the rear lens group 5B. When the telephoto mode or wide mode is set, the front and rear lens cylinders 4A and 4B are independently moved together with the respective lens groups 5A and 5B to predetermined positions. Namely, the lens cylinders 4A and 4B are moved in the axial direction in the cam ring 2, in association with the rotation and feed operation of the cam ring 2 (at least one of the lens cylinders is moved along a curved track formed on the cam ring 2), according to a known method. In the illustrated embodiment, the lens cylinders are slid in the axial direction of the helicoid cylinder 3 via the linear movement guide ring 7.

Figure 3:
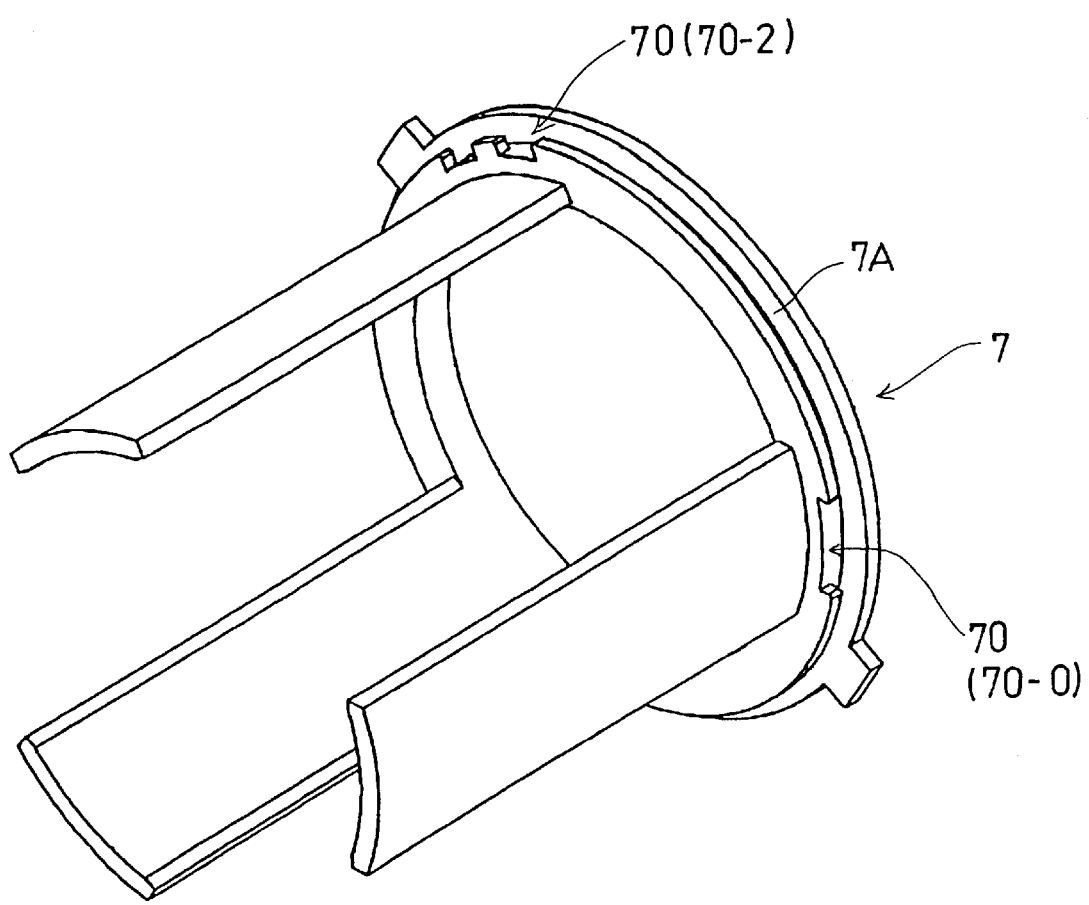
FIG. 3 is a perspective view of a linear movement guide ring according to the present invention.

The linear movement guide ring 7 is adapted to move the lens support cylinder 4 in the axial direction of the helicoid ring 3 without rotating the lens support cylinder 4 with respect to the helicoid ring 3 which is secured to the stationary barrel 31. As shown in FIG. 3, the linear movement guide ring 7 is in the form of a partial cylinder and is located in the cam ring 2. The linear movement guide ring 7 is provided with a guide portion 71 which is slidable in a guide groove (not shown) which is formed linearly and is cut out of the internal multiple thread 3A formed on the inner peripheral surface of the helicoid ring 3 integral with the stationary barrel 31, in the axial direction from the front end to the base end.

Figure 7:
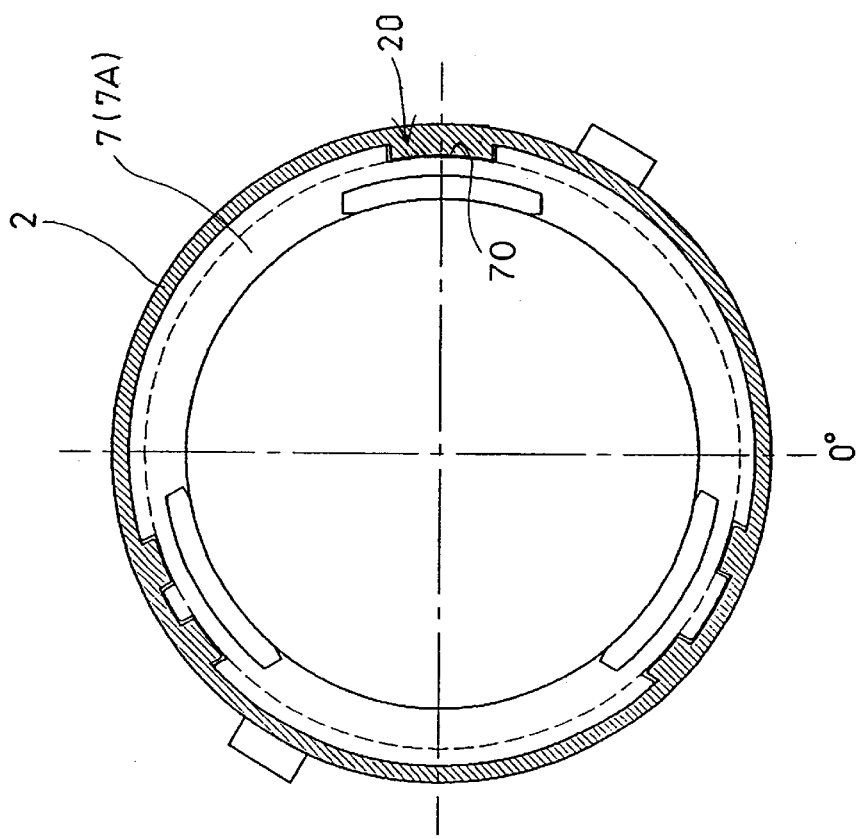
FIG. 7 is an explanatory view of an engagement structure when a relative phase difference between a cam ring and a linear movement guide ring is zero, according to the present invention.

The engagement structure "S" of the present invention is provided between the cam ring 2 and the linear movement guide ring 7. The cam ring 2 is provided on its inner portion with a plurality of engagement projection portions 20 (FIG. 7), and the linear movement guide ring 7 located in the cam ring 2 is provided with a plurality of grooves 70. The grooves 70 are spaced at an appropriate distance to a flange 7A (FIG. 3) which extends in the radial and outward direction from the innermost end of the linear movement guide ring 7.

Figure 4:
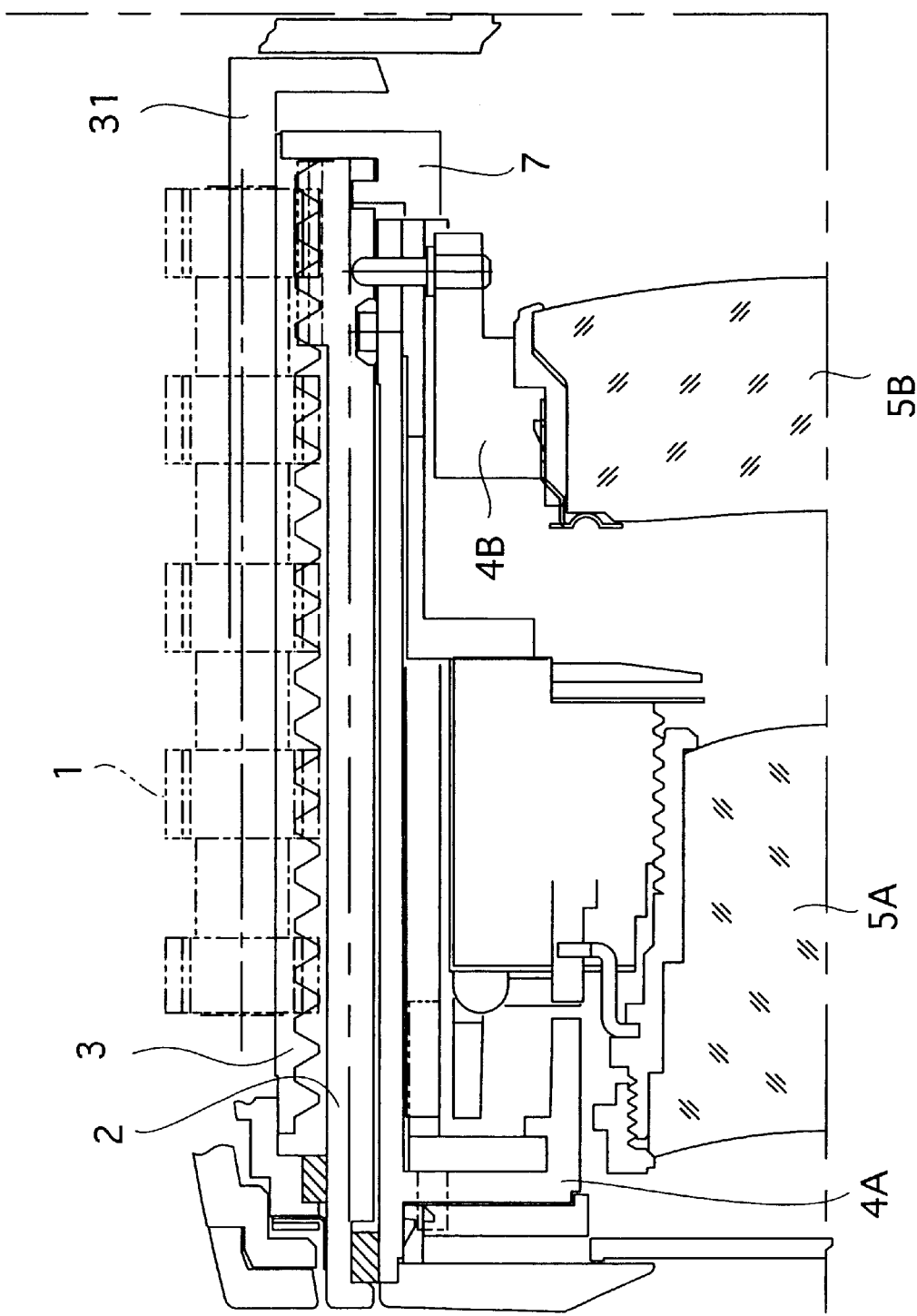
FIG. 4 is an explanatory view showing a lens in a retracted position.
Figure 5:
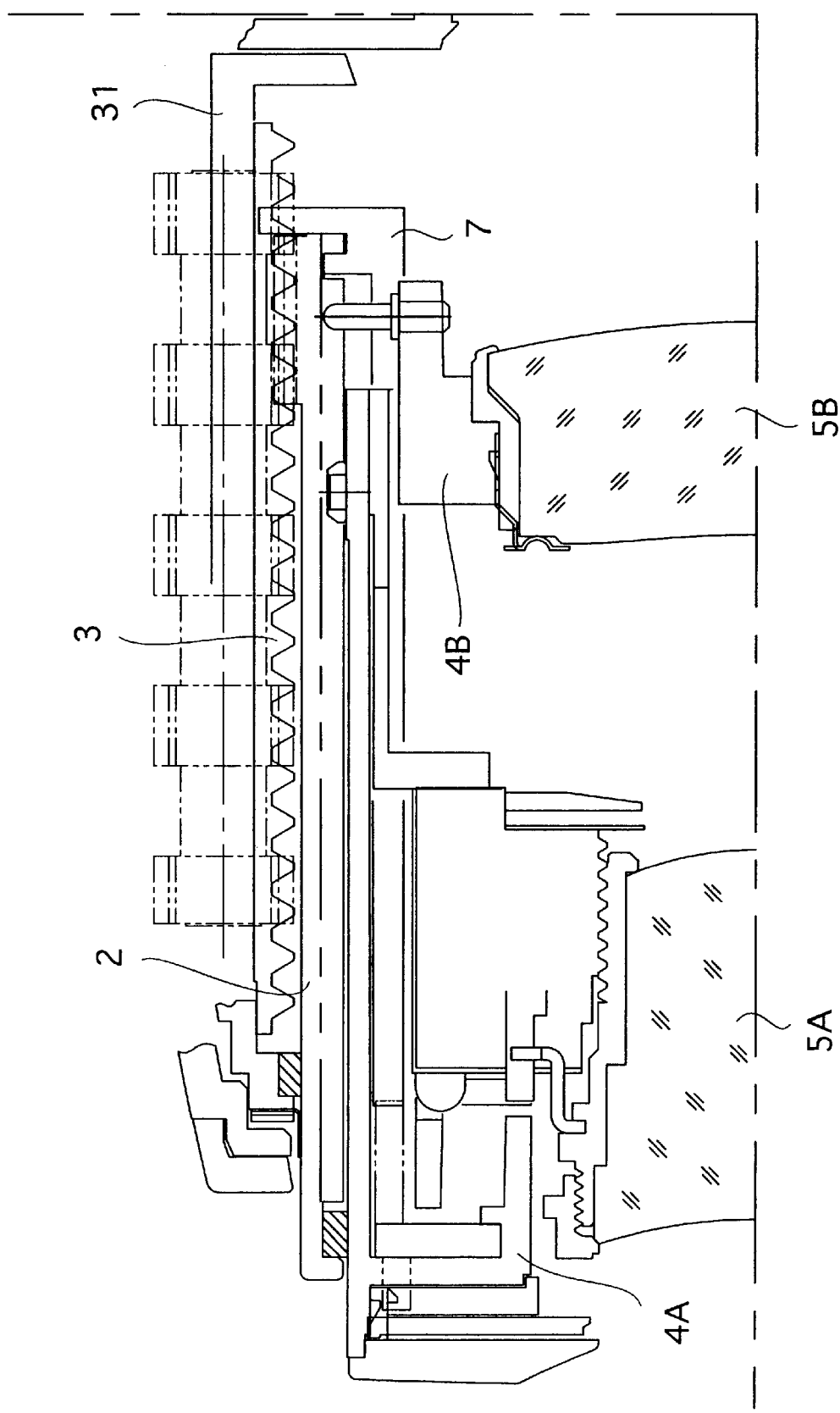
FIG. 5 is an explanatory view showing a lens in a wide mode position.
Figure 6:
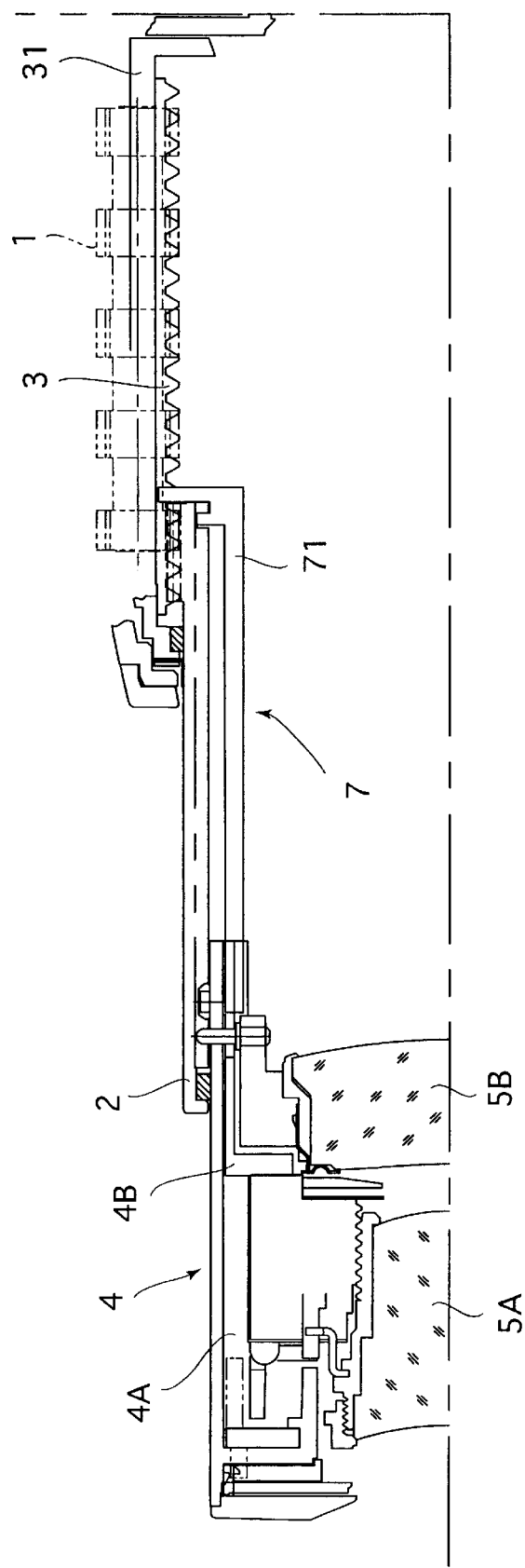
FIG. 6 is an explanatory view showing a lens in a telephoto mode position.

In the lens barrel 10 constructed as above, when the motor is turned on by a power switch in the accommodation position of the lens groups 5A and 5B shown in FIG. 4, the wide mode shown in FIG. 5 is set, and thereafter, the telephoto mode shown in FIG. 6 is set via operation of a zoom lever.

Consequently, the multiple pinion 1 is rotated via the reduction gear train, so that the cam ring 2, whose multiple thread 2A is in mesh with the multiple pinion 1, is rotated and linearly guided so that the cam ring 2 advances via the multiple thread 3A of the helicoid ring 3.

Consequently, the front and rear lens cylinders 4A and 4B are appropriately advanced in accordance with the set mode and in association with the rotation and feed operation of the cam ring 2, i.e., via the front and rear rollers 41 and 42 that engage with the cam grooves 21 and 22, respectively, formed on the inner peripheral surface of the cam ring 2. Accordingly, the wide mode or telephoto mode is set.

The engagement structure using the engagement projection portions will be discussed in connection with the lens barrel 10 of the first embodiment.

Figure 11:
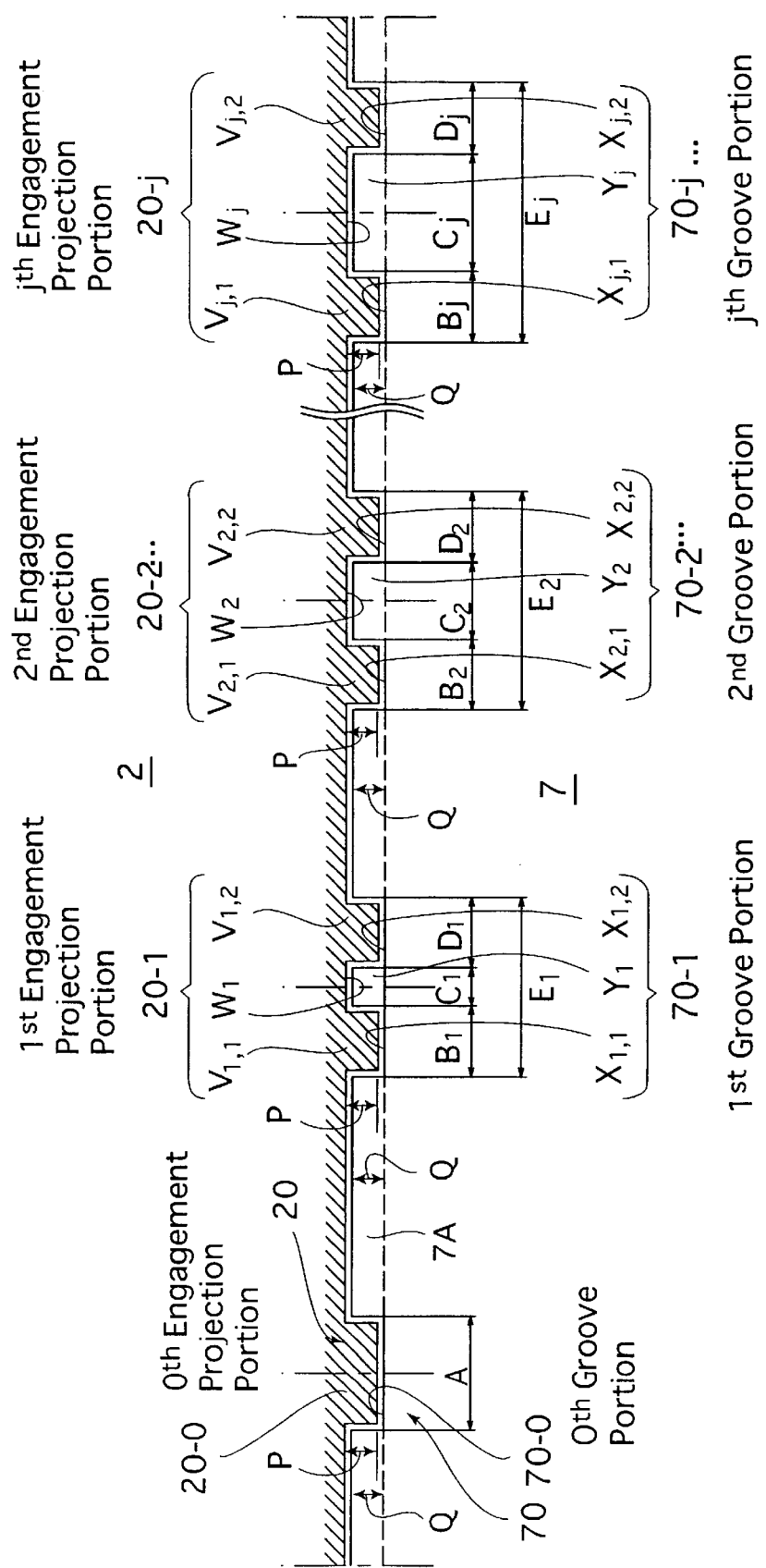
FIG. 11 is an explanatory view showing a positional relationship between engagement projection portions of a cam ring and grooves of a linear movement guide ring, in an engagement structure of the present invention.

FIG. 11 shows a developed view of an engagement structure for cylindrical members according to the present invention. In this engagement structure, the cam ring 2 is supported so as to rotate in a large angular range with respect to the linear movement guide ring 7, i.e., in the range from 0 to 360 degrees. The linear movement guide ring 7 is moved in the axial direction without rotating with respect to the helicoid ring 3 which is secured to the stationary barrel 31, as mentioned above. Note that, for ease of explanation, in the embodiments described hereinafter, three or four engagement projection portions 20 (and corresponding three or four grooves 70) are provided on the guide ring 7 and the cam ring 2. However, the present invention can be applied to any case where the linear movement guide ring 7 and the cam ring 2 are provided with j+1 (j being a positive integer more than or equal to 1) grooves 70 and j+1 engagement projection portions 20, respectively. Also, the pitches (distances) of the engagement projection portions 20 and the grooves 70 are regular (identical) in the illustrated embodiment but may be irregular (not identical), so long as the stable rotation is ensured.

The engagement projection portions 20 include an 0-th projection portion 20-0 through to a j-th projection portion 20-j, having the same projecting length in the radial direction. In the illustrated embodiment, j+1 projections (projection portions) are provided as the engagement projection portions 20. Among the engagement projection portions, the 0-th projection portion 20-0 is slightly smaller in width in the circumferential direction of the cam ring 2 than a length (width) "A".

The first projection portion 20-1 is slightly smaller in width in the circumferential direction than $E_1$ ($A<E_1$) and includes two right and left protrusions (projections) $V_{1,1}$ and $V_{1,2}$ that are slightly smaller in width in the circumferential direction than widths $B_1$ and $D_1$ of corresponding grooves $X_{1,1}$ and $X_{1,2}$. The protrusions $V_{1,1}$ and $V_{1,2}$ having the same width (and the widths $B_1$ and $D_1$ of the grooves $X_{1,1}$ and $X_{1,2}$ are the same). Moreover, the width of the 0-th projection portion 20-0 is greater than the width $V_{1,1}$ of the protrusion. Namely:

$$A > B_1 (=D_1)$$

A groove $W_1$ whose width is slightly larger than $C_1$ is formed between the protrusions $V_{1,1}$ and $V_{1,2}$.

The second projection portion 20-2 is slightly smaller in width than $E_2$ in the circumferential direction (provided that $E_1 < E_2$) and includes right and left protrusions (projections) $V_{2,1}$ and $V_{2,2}$ that are slightly smaller than widths $B_2$ and $D_2$ of grooves $X_{2,1}$ and $X_{2,2}$. Likewise, the protrusions $V_{2,1}$ and $V_{2,2}$ have the same width (or the widths $B_2$ and $D_2$ of the grooves $X_{2,1}$ and $X_{2,2}$ are the same). The widths of the protrusions $V_{2,1}$ and $V_{2,2}$ are to the same as the widths of the protrusions $V_{1,1}$ and $V_{1,2}$ of the first projection portion 20-1, respectively.

Therefore, $B_1=B_2$ and $D_1=D_2$;
Namely: (A>) $B_1=B_2=D_1=D_2$

A groove $W_2$ whose width is slightly larger than $C_2$ ($C_1<C_2$) is formed between the protrusions $V_{2,1}$ and $V_{2,2}$.

The fundamental structure of the j-th projection portion 20-j of the first embodiment is the same as that of the first projection portion 20-1 and the second projection portion 20-2.

Namely, the widths $B_j$, $D_j$ of a pair of right and left grooves of the groove portions 70 (corresponding to the widths of a pair of right and left protrusions of the engagement projection portions 20) other than the 0-th projection portion 20-0, the width $C_j$ of the protrusions or projections provided between the grooves of the groove portions 70 (corresponding to the widths of the grooves provided between right and left protrusions of the engagement projection portions 20, and the overall width $E_j$ of the groove portions 70 satisfy the following conditions:

$$A > B_j (j=1, 2, 3, \ldots)$$

$$B_j = B_{j+1}$$

$$D_j = D_{j+1}$$

$$B_j = D_j$$

$$A > D_j$$

$$A < E_j$$

$$E_j < E_{j+1}$$

$$C_j < C_{j+1};$$

wherein "A" represents the groove width of the groove portion 70 corresponding to the 0-th projection portion 20-0; "$B_j$" and "$D_j$" represent the width of the grooves $X_{j,1}$, $X_{j,2}$ (which correspond to the width of the protrusions $V_{j,1}$, $V_{j,2}$ of the projection portion 20-j) of the groove portion 70-j; "$E_j$" represents the overall width of the groove portion 70-j corresponding to the projection portion 20-j; and "$C_j$" represents the width of the projection $Y_j$ provided in the groove portion 70-j.

The shape and size of the groove portions 70 correspond to the engagement projection portions 20 with a slight gap therebetween. With exception to the 0-th groove portion 70-0, the groove portions 70 include recesses (grooves $X_{j,1}$ and $X_{j,2}$) in which the protrusions ($V_{j,1}$ and $V_{j,2}$) of the engagement projection portions 20 are fitted with a slight gap therebetween, and projections ($Y_j$) which are fitted in the grooves of the engagement projection portions 20 with a slight gap therebetween. Therefore, if the recesses and the projections of the groove portions 70 are formed to satisfy the conditions mentioned above, the engagement projection portions 20 are formed similar to the groove portions 70.

In the first embodiment, the widths $B_j$ and $D_j$ of the grooves of the groove portions 70-j (which correspond to the protrusions of the engagement projection portions 20-j) are formed to satisfy the following conditions:

$$B_j = B_{j+1}$$

$$D_j = D_{j+1}$$

However, these equations are not absolute requirements.

Moreover, in the first embodiment, the widths $B_j$ and $D_j$ of the grooves of the groove portions 70-j (which correspond to the protrusions of the engagement projection portions 20-j) satisfy the following condition:

$$B_j = D_j$$

However, this equation is not an absolute requirement Note that although the above conditions have been directed toward the grooves 70, corresponding dimensions (widths) of the engagement projection portions 20 also satisfy the above conditions.

The assembling operation of the cam ring 2, the linear movement guide ring 7 and the lens support cylinder 4 into the helicoid ring 3 of the stationary barrel 31 will be explained below. It is assumed that the front lens group 5A and the rear lens group 5B are attached in advance to the front and rear lens cylinders 4A and 4B, respectively.

First, prior to incorporation of the cam ring 2, the linear movement guide ring 7, and the lens support cylinder 4 into the helicoid ring 3 of the stationary barrel 31 secured to the camera body, the lens support cylinder 4 is attached to the cam ring 2, and the linear movement guide ring 7 is also attached thereto.

After the cam ring 2 is attached to the linear movement guide ring 7, the angular position is set to an past-telephoto position, and the lens support cylinder 4 is incorporated in the cam ring 2 from the end thereof on the object side.

Thereafter, the cam ring 2 with which the linear movement guide ring 7 and the lens support cylinder 4 have been made integral is attached to the helicoid ring 3 so that the external multiple thread 2A is screw-engaged by the multiple thread 3A of the helicoid ring 3.

Figure 8:
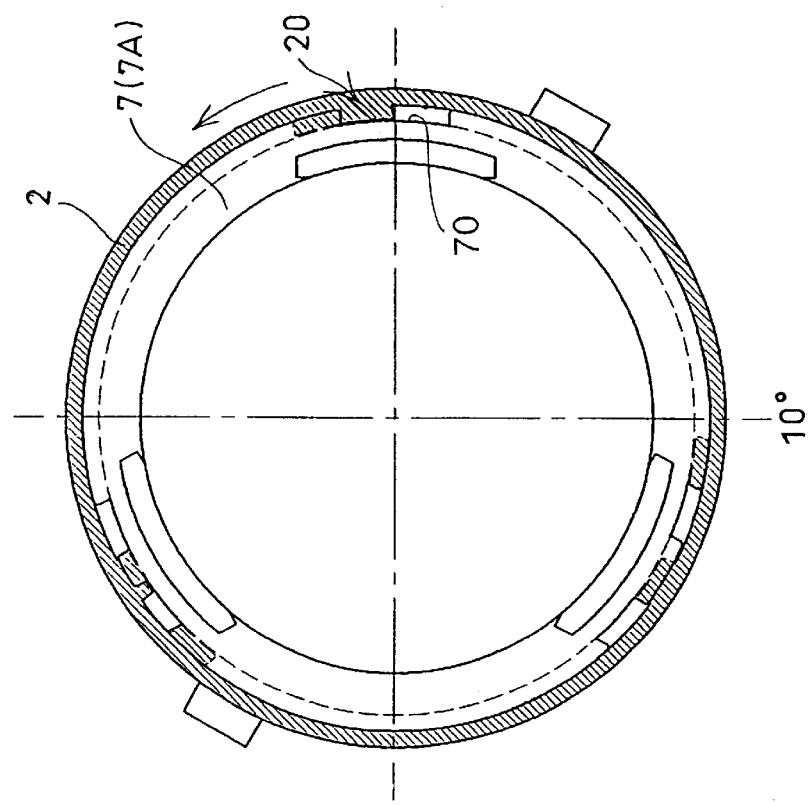
FIG. 8 is an explanatory view of an engagement structure when a relative phase difference between a cam ring and a linear movement guide ring is 10 degrees, according to the present invention.

The cam ring 2 is not disengaged from the linear movement guide ring 7 even if the cam ring 2 is rotated by approximately 360 degrees from the retracted position shown in FIG. 4 to the telephoto mode position shown in FIG. 6. Namely, in the position shown in FIG. 4 (or FIG. 6), the relative angular position relationship between the cam ring 2 and the linear movement guide ring 7 is slightly deviated from the position shown in FIG. 7, in which the engagement projection portions 20 and the groove portions 70 are complementary to each other, i.e., having a phase difference of zero in which there is no overlap therebetween. In this embodiment, it is assumed that the relative angle is adjusted in advance so that, as can be seen in FIG. 8, the phase difference is 10 degrees.

Therefore, in the first embodiment of the invention, if the power switch is turned ON in the retracted position (accommodation position) shown in FIG. 4, the motor (not shown) is driven to rotate the multiple pinion 1, so that the cam ring 2 begins rotating while being engaged and guided by the internal multiple thread 3A of the helicoid ring 3. Consequently, the cam ring 2 is moved forward while rotating, however, the linear movement guide ring 7 provided in the cam ring 2 does not rotate while guiding the rotation of the cam ring 2 in the circumferential direction.

Figure 9:
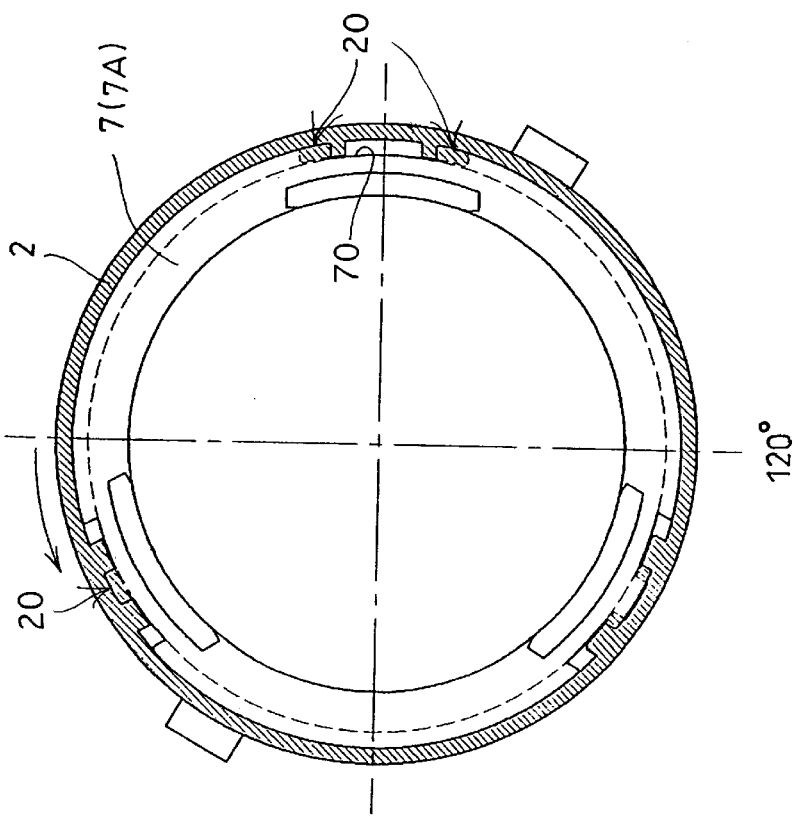
FIG. 9 is an explanatory view of an engagement structure when a relative phase difference between a cam ring and a linear movement guide ring is 120 degrees, according to the present invention.
Figure 12:
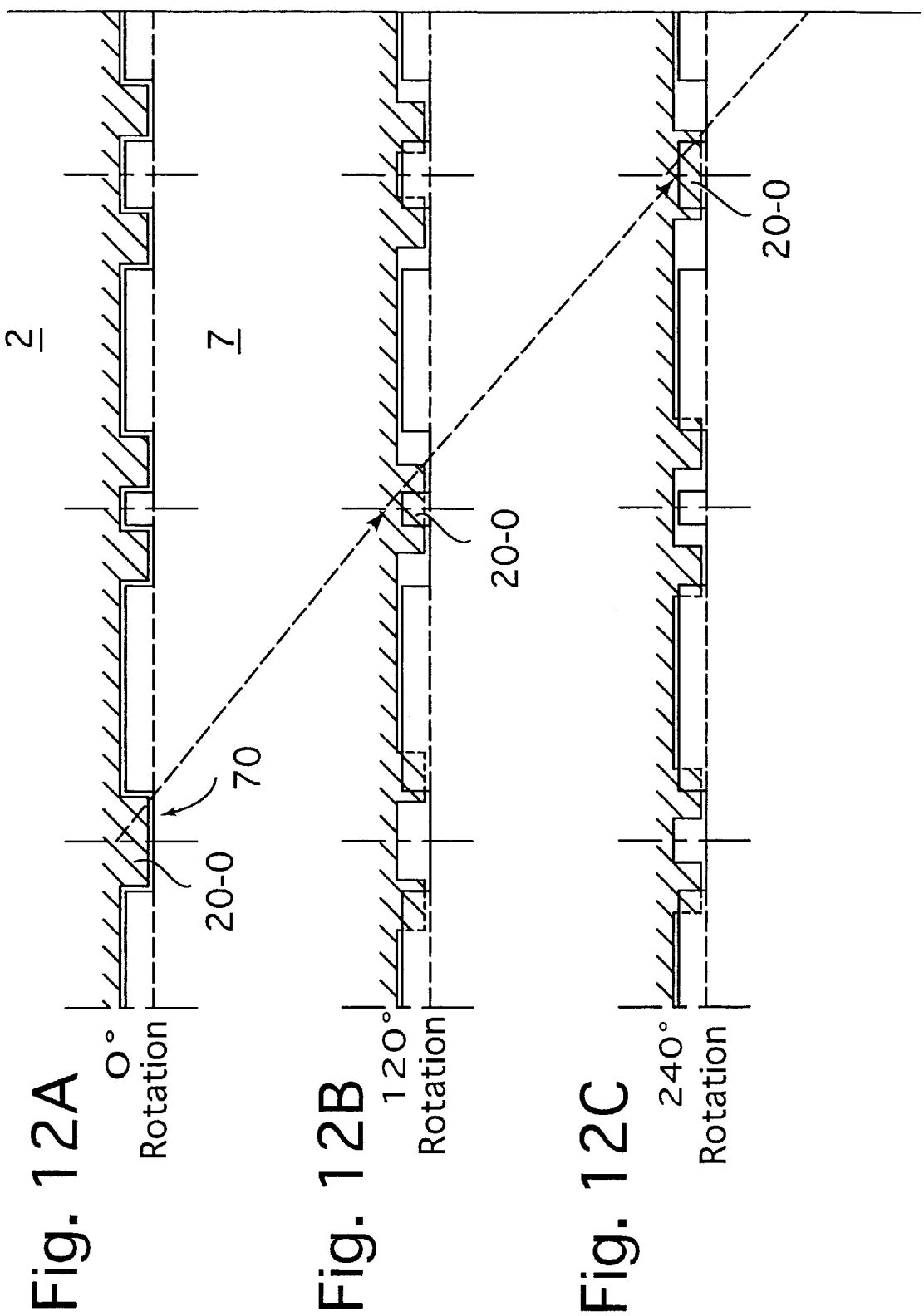
FIGS. 12A, 12B and 12C are explanatory views each showing a relationship between engagement projection portions of a cam ring and grooves of a linear movement guide ring, in a first embodiment of an engagement structure, at a relative phase difference of zero, 120 degrees, and 240 degrees, respectively.

During the angular displacement of the cam ring 2 with respect to the linear movement guide ring 7 by a predetermined angle (e.g., approximately 120 degrees as shown in FIGS. 9 and 12B) to the wide mode position shown in FIG. 5, the engagement projection portions 20 overlap the protrusions (projections) of the groove portions 70 to serve as a stop, and accordingly, no disengagement of the engagement projection portions 20 from the groove portions 70 of the linear movement guide ring 7 occurs.

Figure 10:
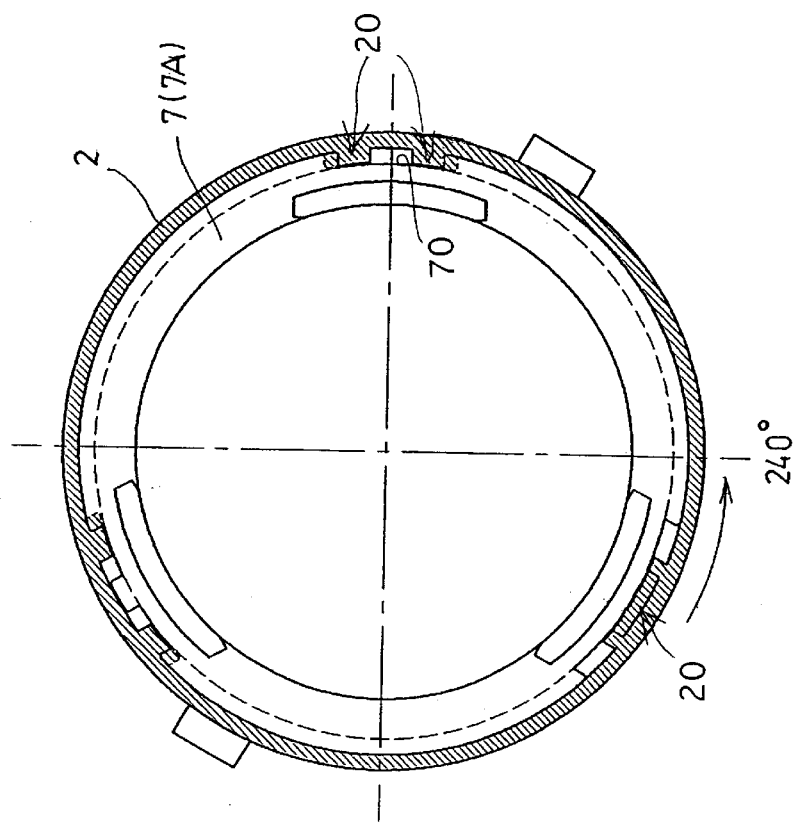
FIG. 10 is an explanatory view of an engagement structure when a relative phase difference between a cam ring and a linear movement guide ring is 240 degrees, according to the present invention.

Likewise, during the angular displacement of the cam ring 2 with respect to the linear movement guide ring 7 by a predetermined angle (e.g., an angle approaching 360 degrees) to the telephoto mode position shown in FIG. 6, the engagement projection portions 20 overlap the protrusions of the groove portions 70 to serve as a stop, and accordingly, no disengagement of the engagement projection portions 20 from the groove portions 70 of the linear movement guide ring 7 occurs, as shown in FIGS. 10 and 12C.

A second embodiment of an engagement structure of the present invention will be discussed below. In the second embodiment, the members other than the engagement projection portions 20 of the cam ring 2 and the groove portions 70 of the linear movement guide ring 7 are the same as those in the first embodiment and, hence, the following discussion will be chiefly addressed to the engagement projection portions 20 and the groove portions 70.

Figure 13:
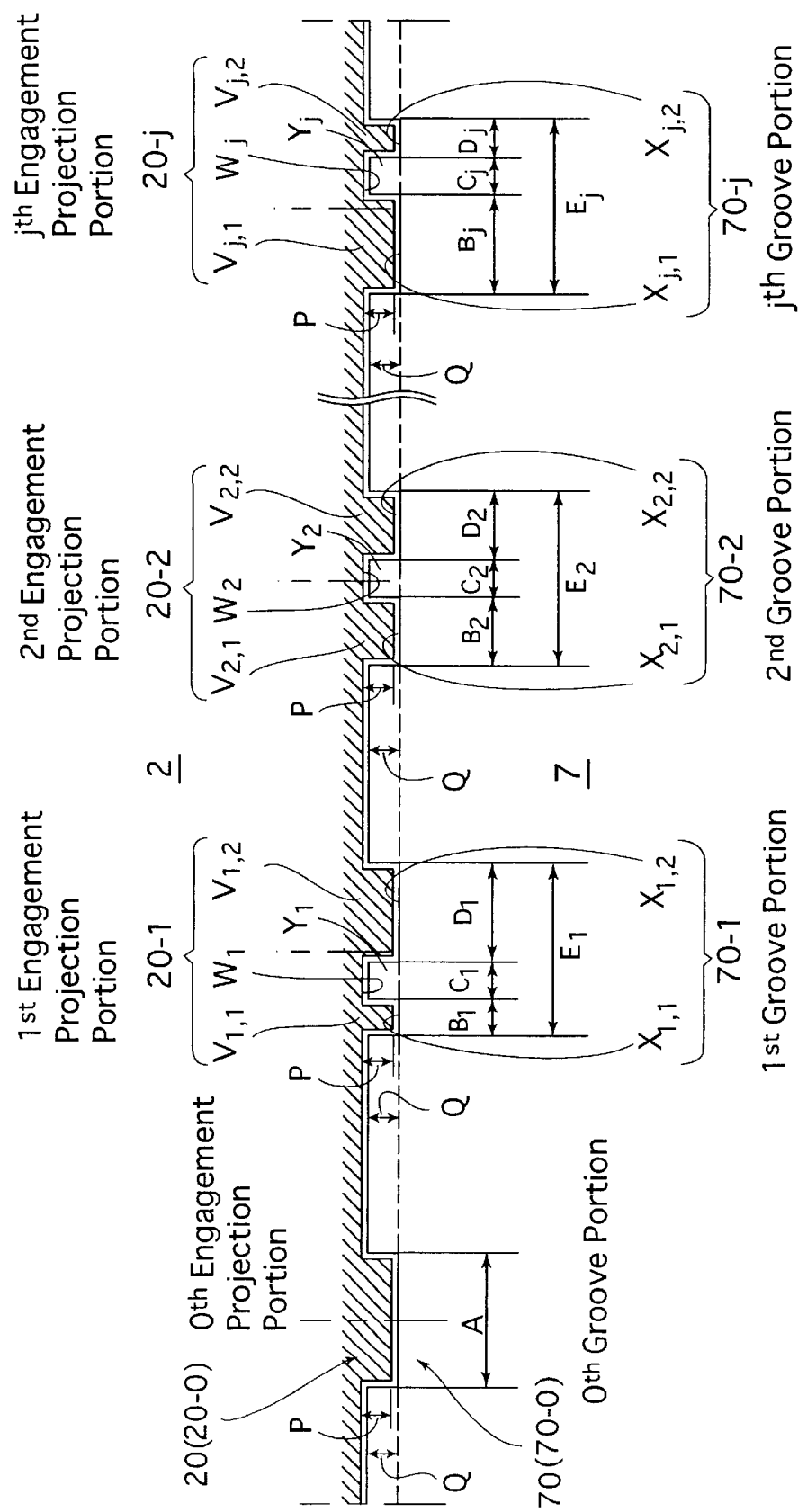
FIG. 13 is an explanatory view showing a positional relationship between engagement projection portions of a cam ring and grooves of a linear movement guide ring, in a second embodiment of an engagement structure of the present invention.

FIG. 13 shows a developed view of an engagement structure of cylindrical members according to the second embodiment. In the engagement structure for the cylindrical members in the second embodiment, the cam ring 2 is supported and engaged by the linear movement guide ring 7 so as to relatively rotate by a large angle, i.e., in the range of 0 to 360 degrees. As mentioned above, the linear movement guide ring 7 linearly moves in the axial direction without rotating relative to the helicoid ring 3 which is secured to the stationary barrel 31. In the present invention, the (j+1) engagement projection portions 20 and the (j+1) groove portions 70 are provided on the cam ring 2 and the linear movement guide ring 7, respectively; however the number thereof is not limited thereto so long as there are more than 1, respectively.

The (j+1) engagement projection portions 20 include a 0-th projection portion 20-0, a first projection portion 20-1, and a j-th projection portion 20-$j$, having the same projecting length in the radial direction. The projection portions 20-$j$ other than the 0-th projection portion are each provided with a groove $W_j$. Note that the 0-th projection portion 20-0 is slightly smaller in width in the circumferential direction than the width "A" of the 0-th groove portion 70-0.

The first projection portion 20-1 is slightly smaller in the width in the circumferential direction than $E_1$ ($A<E_1$). The first projection portion 20-1 is provided with right and left protrusions $V_{1,1}$ and $V_{1,2}$ whose widths are slightly smaller than the widths $B_1$ and $D_1$ of the grooves $X_{1,1}$ and $X_{1,2}$ of the first groove portion 70-1.

A groove $W_1$ whose width is slightly larger than the width $C_1$ of the projection $Y_1$ of the first groove portion 70-1 is provided between the protrusions $V_{1,1}$ and $V_{1,2}$.

The second projection portion 20-2 has a width in the circumferential direction, which is slightly smaller than the width $E_2$ ($E_2=E_1$) of the second groove portion 702. The second projection portion 20-2 is provided with right and left protrusions (projections) $V_{2,1}$ and $V_{2,2}$ whose widths are slightly smaller than the widths $B_2$ and $D_2$ of the grooves $X_{2,1}$ and $X_{2,2}$ of the second groove portion 70-2.

A groove $W_2$ whose width is slightly larger than the width $C_2$ of the projection $Y_2$ of the second groove portion 70-2 is provided between the protrusions $V_{2,1}$ and $V_{2,2}$.

The fundamental structure of the j-th projection portion 20-$j$ of the second embodiment is to the same as that of the first and second projection portions 20-1 and 20-2.

Namely, if the number of the groove portions 70 and engagement projection portions 20 is equal to (j+1), for example, the widths $B_j$, $D_j$ of the right and left grooves of the groove portions 70 (corresponding to the widths of a pair of right and left protrusions of the engagement projection portions 20) and the width $C_j$ of the protrusions between the grooves of the groove portions 70 (corresponding to the widths of the grooves provided between right and left protrusions of the engagement projection portions 20) satisfy the following conditions:

$A > B_j$ (j=1, 2, 3, . . . : no particular order is observed)

$B_j < B_{j+1}$ $C_j = C_{j+1}$ $A > D_j$ $E_j = E_{j+1}$ $A < E_j$

Note that in the second embodiment, the widths $B_j$, $D_j$ of the right and left grooves of the groove portions 70 (corresponding to the right and left projections of the engagement projection portions 20) can be the same in at least one portion.

The shape and size of the groove portions 70 correspond to the engagement projection portions 20 with a slight gap therebetween. With exception to the 0-th groove portion 70-0, the groove portions 70 include recesses (grooves $X_{j,1}$ and $X_{j,2}$) in which the protrusions ($V_{j,1}$ and $V_{j,2}$) of the engagement projection portions 20 are fitted with a slight gap therebetween, and projections ($Y_j$) which are fitted in the grooves of the engagement projection portions 20 with a slight gap therebetween. Therefore, if the recesses and the projections of the groove portions 70 are formed to satisfy the conditions mentioned above, the engagement projection portions 20 are formed similar to the groove portions 70.

In the second embodiment, the overall width $E_j$ of the groove portions 70-$j$, which correspond to the engagement projection portions 20-$j$, satisfies the following condition:

$$E_j = E_{j+1}$$

However, this condition is not an absolute requirement.

Likewise, the projection width $C_j$ between the grooves $X_{j,1}$ and $X_{j,2}$ (which corresponds to the groove width between the protrusions $V_{j,1}$ and $V_{j,2}$ of the projection portions 20) of the groove portions 70-$j$ satisfies the following condition:

$$C_j = C_{j+1}$$

However, this condition is not an absolute requirement. The value of $C_j$ can be increased as the value of $j$ is increased.

Note that although the above conditions have been directed toward the grooves 70, corresponding dimensions (widths) of the engagement projection portions 20 also satisfy the above conditions.

The assembling operation of the cam ring 2, the linear movement guide ring 7, and the lens support cylinder 4 into the helicoid ring 3 of the stationary barrel 31 is the same as in the first embodiment, and therefore no explanation therefore will be given herein.

Figure 14:
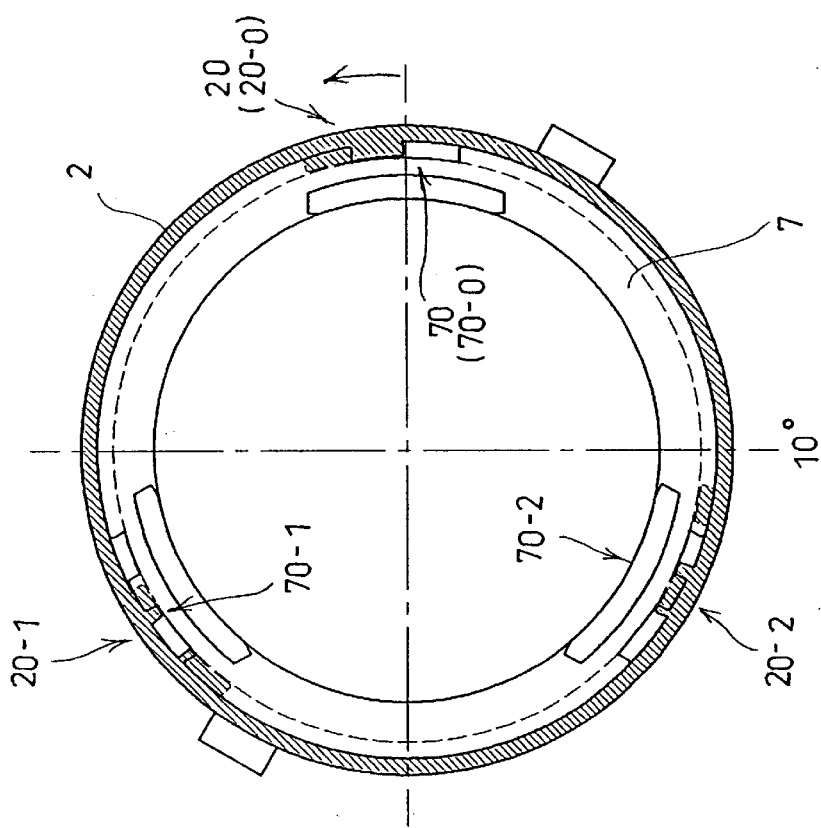
FIG. 14 is an explanatory view of an engagement structure when a relative phase difference between a cam ring and a linear movement guide ring is zero, according to a second embodiment of the present invention.
Figure 15:
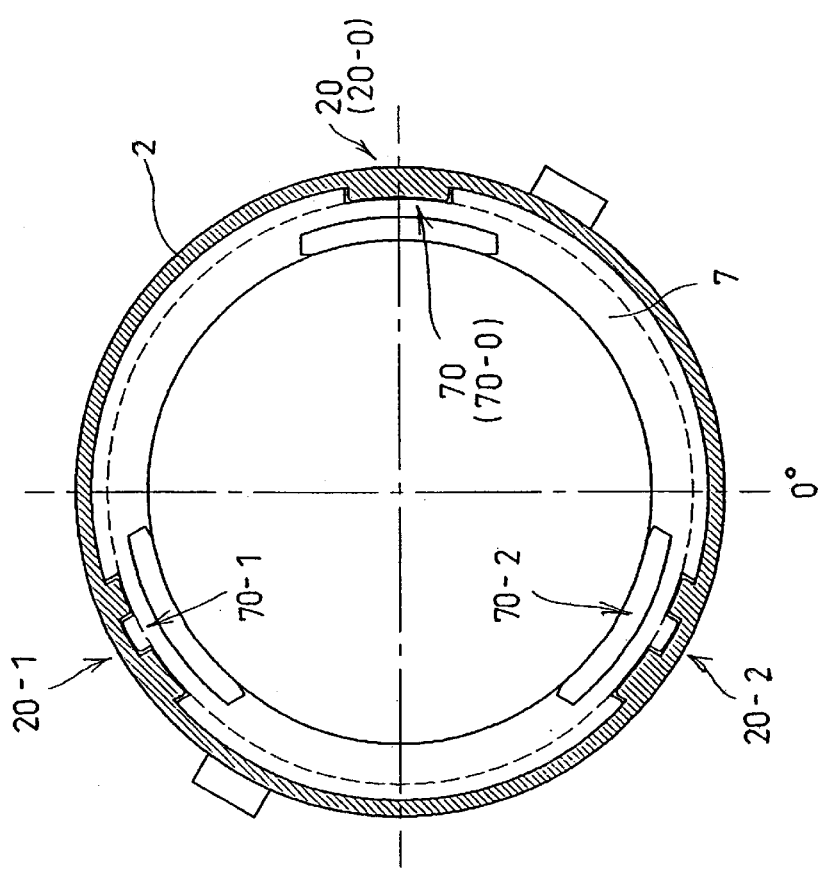
FIG. 15 is an explanatory view of an engagement structure when a relative phase difference between a cam ring and a linear movement guide ring is 10 degrees, according to a second embodiment of the present invention.
Figure 16:
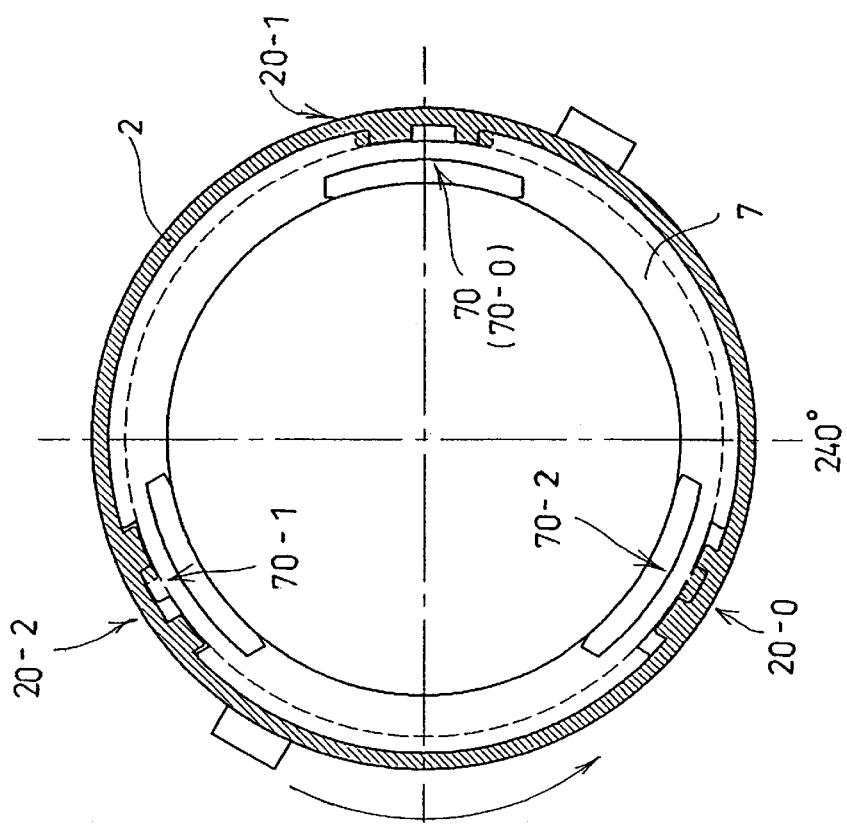
FIG. 16 is an explanatory view of an engagement structure when a relative phase difference between a cam ring and a linear movement guide ring is 120 degrees, according to a second embodiment of the present invention.

The cam ring 2 is not disengaged from the linear movement guide ring 7 even if the cam ring 2 is rotated by an angle approaching 360 degrees (with respect to the helicoid ring 3) from the retracted position shown in FIG. 4 to the telephoto mode position shown in FIG. 6 via the wide mode position shown in FIG. 5, as in the first embodiment. Namely, in the position shown in FIG. 15, the relative angular position between the cam ring 2 and the linear movement guide ring 7 is slightly deviated from the position shown in FIG. 14 in which the engagement projection portions 20 and the groove portions 70 correspond to each other, i.e., having a phase difference of zero in which there is no overlap therebetween. In this embodiment, it is assumed that the relative angle is adjusted in advance so that the phase difference is 10 degrees in the retracted position.

Therefore, in the second embodiment, if the power switch is turned ON in the retracted position (accommodation position) of the lens barrel 10, the motor (not shown) is driven to rotate the multiple pinion 1, so that the cam ring 2 begins rotating while being engaged and guided by the internal multiple thread 3A of the helicoid ring 3, as in the first embodiment. Consequently, the cam ring 2 is moved forward while rotating, however, the linear movement guide ring 7 provided in the cam ring 2 does not rotate while guiding the rotation of the cam ring 2 in the circumferential direction.

Figure 18A:
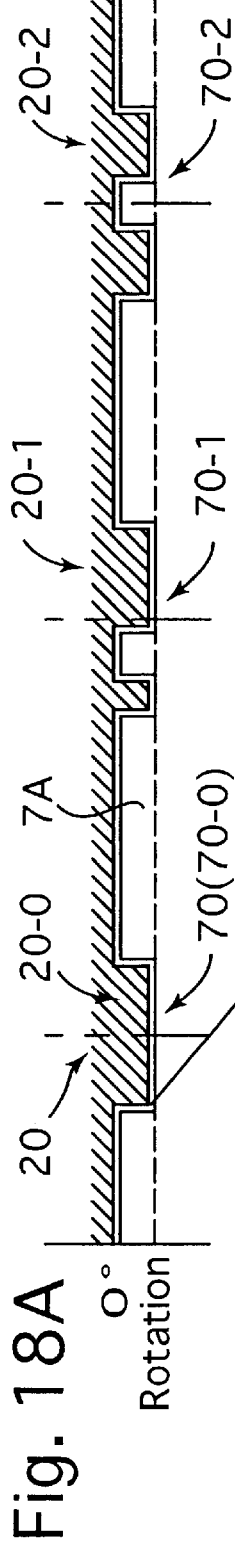
FIGS. 18A, 18B and 18C are explanatory views each showing a relationship between engagement projection portions of a cam ring and grooves of a linear movement guide ring, in a second embodiment of an engagement structure, at a relative phase difference of zero, 120 degrees, and 240 degrees, respectively.
Figure 18B:
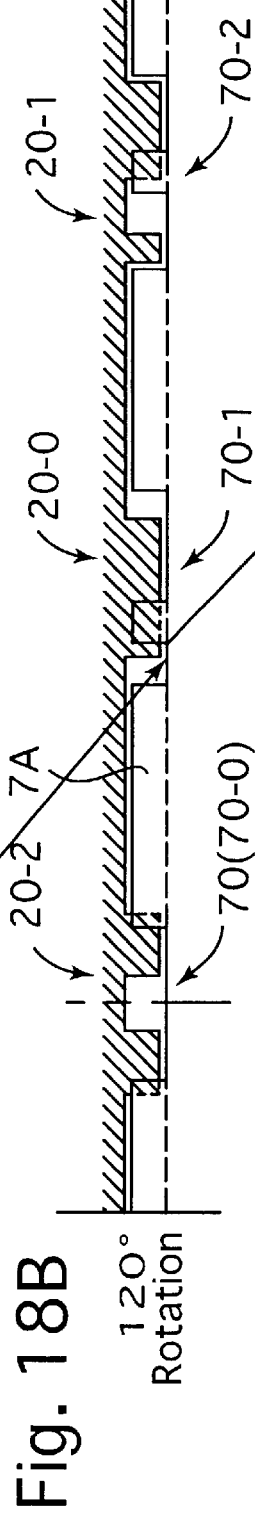

During the angular displacement of the cam ring 2 with respect to the linear movement guide ring 7 by a predetermined angle (e.g., approximately 120 degrees as shown in FIG. 18B) to the wide mode position, the engagement projection portions 20 overlap the protrusions of the groove portions 70 to serve as a stop and accordingly, no disengagement of the engagement projection portions 20 from the groove portions 70 of the linear movement guide ring 7 occurs.

Figure 17:
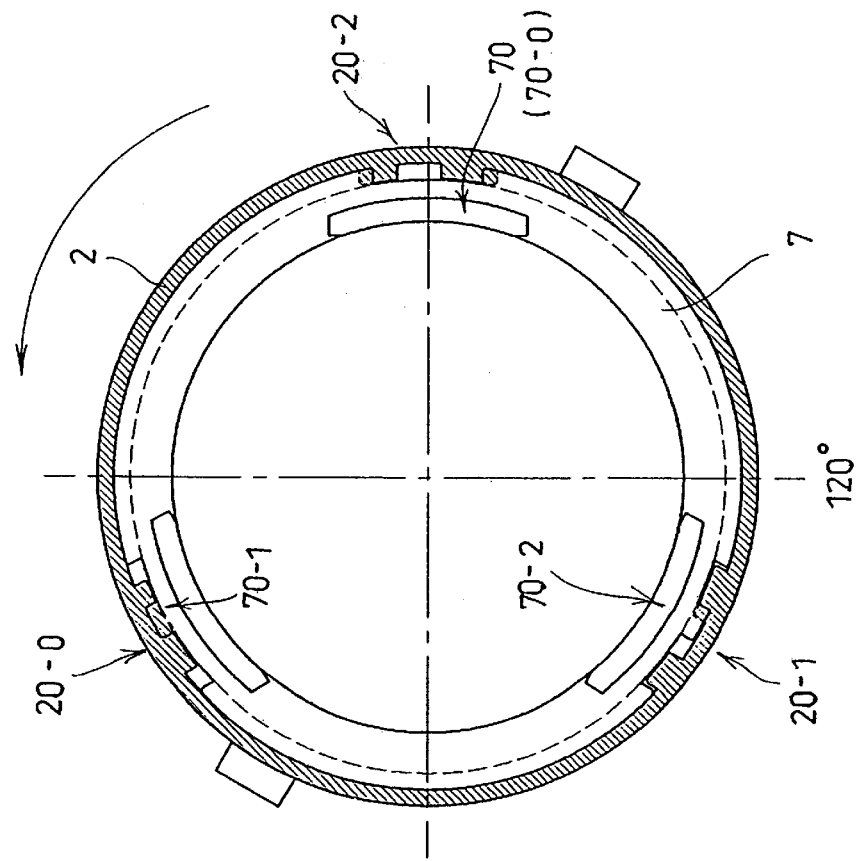
FIG. 17 is an explanatory view of an engagement structure when a relative phase difference between a cam ring and a linear movement guide ring is 240 degrees, according to a second embodiment of the present invention.
Figure 18C:
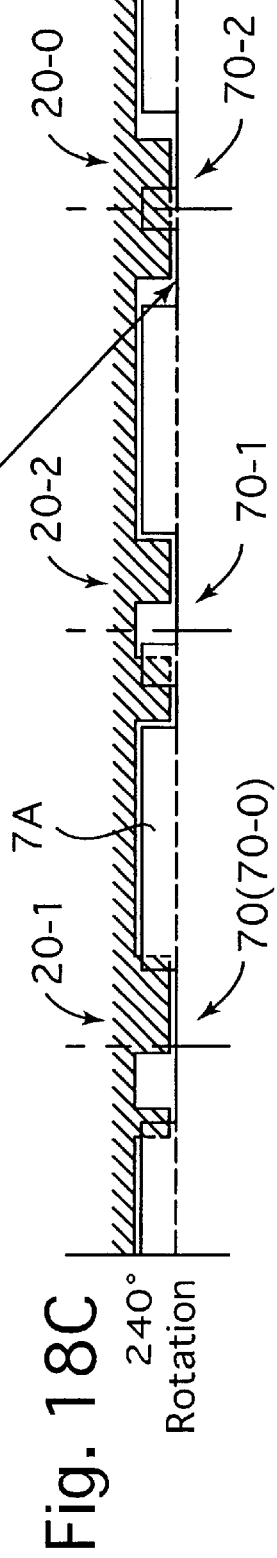

Likewise, during the angular displacement of the cam ring 2 with respect to the linear movement guide ring 7 by a predetermined angle (e.g., an angle approaching 360 degrees) to the telephoto mode position, the engagement projection portions 20 overlap the protrusions of the groove portions 70 to serve as a stop, and accordingly, no disengagement of the engagement projection portions 20 from the groove portions 70 of the linear movement guide ring 7 occurs, as shown in FIGS. 17 and 18C.

A third embodiment of an engagement structure of the present invention will be discussed below. In the third embodiment, the members other than the engagement projection portions 20 of the cam ring 2 and the groove portions 70 of the linear movement guide ring 7 are the same as those in the first embodiment and, hence, the following discussion will be chiefly addressed to the engagement projection portions 20 and the groove portions 70.

FIG. 19 shows a developed view of an engagement structure of cylindrical members according to the third embodiment. In the engagement structure for the cylindrical members in the third embodiment, the cam ring 2 is supported and engaged by the linear movement guide ring 7 so as to relatively rotate by a large angle, i.e., in the range of 0 to 360 degrees. In the third embodiment, the (j+1) engagement projection portions and the (j+1) groove portions are provided on the cam ring 2 and the linear movement guide ring 7, respectively, however, the number thereof is not limited thereto so long as there are more than 1, respectively.

Note that the projections $V_{j,k}$ and $Y_{j,k}$ ($j$, $k$=1, 2, 3, . . . , wherein no special order is observed) represent the k-th projections of the j-th projection portion and the j-th groove portion. Likewise, the grooves $W_{j,k}$ and $X_{j,k}$ ($j$, $k$=1, 2, 3, . . . , wherein no special order is observed) represent the k-th groove of the j-th projection portion and the the j-th groove portion.

The (j+1) engagement projection portions 20 include 0-th projection portion 20-0, a first projection portion 20-1, and a j-th projection portion 20-$j$, having the same projecting length in the radial direction. The engagement projection portions 20 other than the 0-th projection portion are each provided with a groove $W_{j,k}$. In the third embodiment, the engagement projection portions 20 are arranged so that the number of the grooves $W_{j,k}$ is increased one by one along the circumferential direction. For example, the first projection portion 20-1 has one groove (i.e., j=1, k=1) and the j-th projection portion 20-$j$ has k grooves. Note that the 0-th projection portion 20-0 is slightly smaller in width in the circumferential direction than the width "A" of the 0-th groove portion 70-0.

The first projection portion 20-1 is provided with right and left protrusions $V_{1,1}$ and $V_{1,2}$ and a groove $W_{1,1}$ provided between the protrusions $V_{1,1}$ and $V_{1,2}$. The overall width of the first projection portion 20-1 in the circumferential direction is slightly smaller than $E_1$ (A<$E_1$) of the overall width of the first groove portion 70-1.

The widths of the protrusions $V_{1,1}$ and $V_{1,2}$ are slightly smaller than the widths $B_{1,1}$ and $B_{1,2}$ of the grooves $X_{1,1}$ and $X_{1,2}$ of the first groove portion 70-1. Note that the widths of the protrusions $V_{1,1}$ and $V_{1,2}$ are the same.

The width of the groove $W_{1,1}$ formed between the protrusions $V_{1,1}$ and $V_{1,2}$ is slightly larger than the width $C_{1,1}$ of the projection $Y_{1,1}$ of the first groove portion 70-1. The width of the 0-th projection portion 20-0 is slightly larger than the width of the protrusion $V_{1,1}$. Namely:

$$A > B_{1,1} (=B_{1,2})$$

The second projection portion 20-2 has three protrusions $V_{2,1}$ $V_{2,2}$ and $V_{2,3}$ and two grooves $W_{2,1}$ and $W_{2,2}$ between the protrusions. The overall width of the second projection portion 20-2 in the circumferential direction is slightly smaller than the overall width $E_2$ ($E_2=E_1$) of the second groove portion 70-2. The width of the protrusions $V_{2,1}$, $V_{2,2}$ and $V_{2,3}$ are slightly smaller than the widths $B_{2,1}$, $B_{2,2}$ and $B_{2,3}$ of the grooves $X_{2,1}$, $X_{2,2}$ and $X_{2,3}$ of the second groove portion 70-2, respectively. Note that the widths of the protrusions $V_{2,1}$, $V_{2,2}$ and $V_{2,3}$ are the same. Consequently, the following relationship is established:

$$A>B_{2,1}(=B_{2,2}=B_{2,3})$$

The width of the groove $W_{2,1}$ between the protrusions $V_{2,1}$ and $V_{2,2}$ is slightly larger than the width $C_{2,1}$ of the projection $Y_{2,1}$ of the second groove 70-2. Likewise, the width of the groove $W_{2,2}$ between the protrusions $V_{2,2}$ and $V_{2,3}$ is slightly larger than the width $C_{2,2}$ of the projection $Y_{2,2}$ of the second groove 70-2. Note that in the third embodiment, the widths $W_{2,1}$ and $W_{2,2}$ are the same. Namely:

$$C_{1,1}>C_{2,1}(=C_{2,2})$$

The widths of the protrusions $V_{2,1}$ $V_{2,2}$, and $V_{2,3}$ formed in the second projection portion 20-2 are the same as each other and are slightly smaller than the widths $B_{2,1}$, $B_{2,2}$ and $B_{2,3}$ of the grooves $X_{2,1}$, $X_{2,2}$ and $X_{2,3}$ formed in the second groove portion 70-2 and are slightly smaller than the widths $V_{1,1}$ and $V_{1,2}$ formed in the first projection portion 20-1. Namely:

$$B_{1,1}=B_{1,2}>B_{2,1}=B_{2,2}=B_{2,3}$$

The same is true for the j-th projection portion 20-j. With exception to the 0-th groove portion 70-0, the width of the groove portions 70 satisfy the following relationship with respect to the width $B_{j,k}$ which corresponds to the right and left protrusions $V_{j,k}$ of the remaining engagement projection portions 20 (i.e., the width of the right and left grooves formed on the groove portions 70):

$$A>B_{j,k}$$

(j, k=1, 2, 3, ..., wherein no particular order is observed)

$$B_{j,k}>B_{j+1,k}$$

Moreover, the width of the k-th groove $W_{j,k}$ of the j-th engagement projection portion 20-j is slightly larger than the width $C_{j,k}$ of the k-th projection $Y_{j,k}$ in the corresponding j-th groove portion 70-j, and is slightly larger than the width of the k-th groove $W_{j+1,k}$ in the (j+1)-th projection portion 20-(j+1). Namely:

$$C_{j,k}>C_{j+1,k}$$

The widths of the projections $V_{j,k}$ provided in the j-th projection portion 20-j are the same as each other. Namely:

$$B_{j,k}=B_{j,k+1}$$

Likewise, the widths of the grooves $W_{j,k}$ provided in the j-th projection portion 20-j are the same each other. Namely:

$$C_{j,k}=C_{j,k+1}$$

The overall width of each split engagement projection portion 20 is slightly smaller than the overall width $E_j$ of each groove portion 70, however, the width of the engagement projection portions 20 or the groove portion 70 (excluding the 0-th projection portion or groove portion) are the same, respectively. However, an equal width is not absolutely necessary. For example, the width can be increased as the number j is increased. Namely, if the overall width of the groove portion 70 is $E_j$, the following condition is satisfied:

$$E_j<E_{j+1}$$

Furthermore, in the third embodiment, the dividing number of the engagement projection portions 20, i.e., the number of projections thereof, increases as the number of engagement projection portions 20 increase. Namely, the following condition is satisfied wherein $U_j$ designates the number of engagement projection portions 20:

$$U_j<U_{j+1}$$

Consequently, when the engagement projection portions 20 are inserted in or removed from the groove portions 70, the positions of the engagement projection portions 20 and the groove portions 70 can be easily confirmed.

The shape and size of the groove portions 70 correspond to the engagement projection portions 20 with a slight gap therebetween. The grove portions 70 include recesses (grooves $X_{j,k}$) in which the projections $Y_{j,k}$ of the engagement projection portions 20 are fitted with a slight gap therebetween, and projections $Y_{j,k}$ which are fitted in the grooves $W_{j,k}$ of the engagement projection portions 20 with a slight gap therebetween. Therefore, if the engagement projection portions 20 are formed to satisfy the conditions mentioned above, the recesses (grooves $X_{j,k}$) and the projections $Y_{j,k}$ of the groove portions 70 are formed similarly to those of the engagement projection portions 20.

In the third embodiment, the width $B_{j,k}$ of the groove portions 70 (which correspond to the width of the protrusions $V_{j,k}$ of the engagement projection portions 20) is formed to satisfy the following condition:

$$B_{j,k}=B_{j,k+1}$$

(j, k=1, 2, 3, ..., wherein no particular order is observed) However, this condition is not an absolute requirement.

Moreover, the projection width $C_{j,k}$ of the groove portions 70-j (which corresponds to the groove width of the projection portions 20) satisfies the following condition:

$$C_{j,k}=C_{j,k+1}$$

However, this condition is not an absolute requirement. In another embodiment, the projection width $C_{j,k}$ of the groove portions 70-j satisfies the following condition:

$$C_{j,k}>C_{j,k+1}$$

Note that although the above conditions have been directed toward the grooves 70, corresponding dimensions (widths) of the engagement projection portions 20 also satisfy the above conditions.

The assembling operation of the cam ring 2, the linear movement guide ring 7 and the lens support cylinder 4 into the helicoid ring 3 of the stationary barrel 31 is the same as in the first or second embodiment and therefore no explanation therefore will be given herein.

Figure 20:
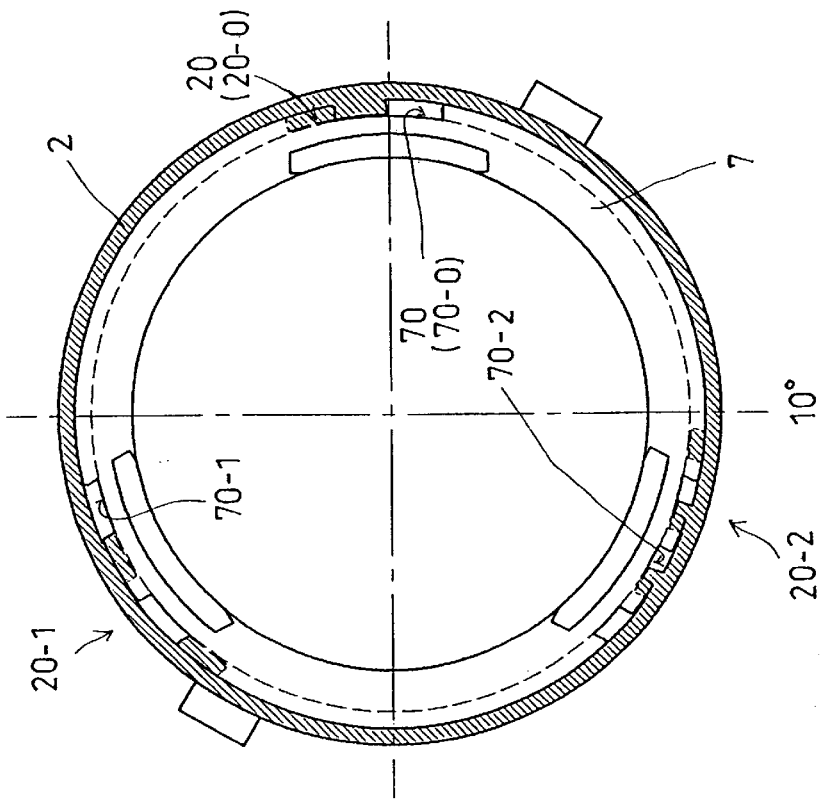
FIG. 20 is an explanatory view of an engagement structure when a relative phase difference between a cam ring and a linear movement guide ring is zero, according to a third embodiment of the present invention.
Figure 21:
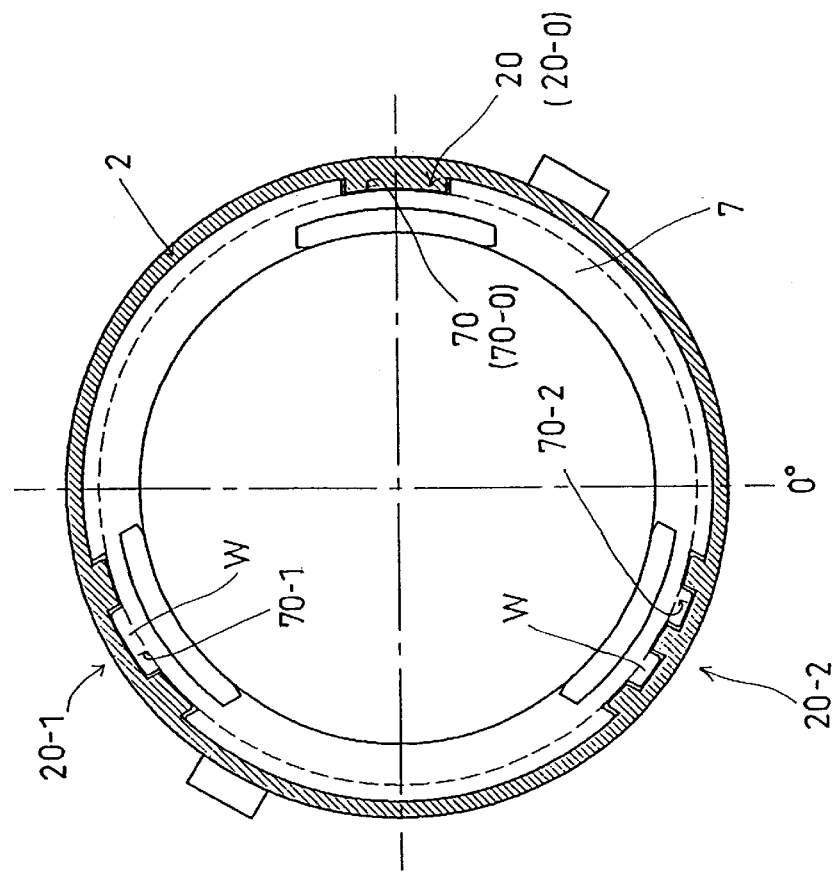
FIG. 21 is an explanatory view of an engagement structure when a relative phase difference between a cam ring and a linear movement guide ring is 10 degrees, according to a third embodiment of the present invention.
Figure 22:
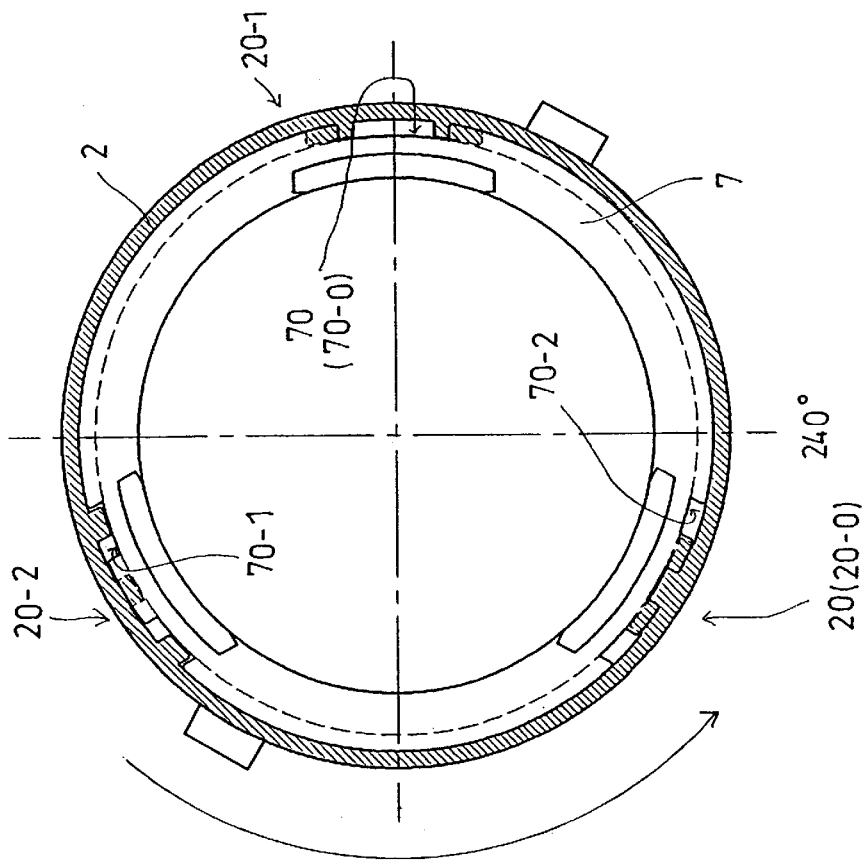
FIG. 22 is an explanatory view of an engagement structure when a relative phase difference between a cam ring and a linear movement guide ring is 120 degrees, according to a third embodiment of the present invention.

The cam ring 2 is not disengaged from the linear movement guide ring 7 even if the cam ring 2 is rotated by an angle approaching 360 degrees from the retracted position shown in FIG. 4 to the telephoto mode position shown in FIG. 6 via the wide mode position shown in FIG. 5. Namely, in the position shown in FIG. 21, the relative angular position between the cam ring 2 and the linear movement guide ring 7 is slightly deviated from the position shown in FIG. 20 in which the engagement projection portions 20 and the grooves 70 correspond to each other, i.e., having a phase difference of zero (or phase difference of 360 degrees) in which there is no overlap therebetween. In this embodiment, it is assumed that the relative angle is adjusted in advance so that the phase difference is 10 degrees in the retracted position.

Therefore, in the third embodiment, if the power switch is turned ON in the retracted position (accommodation position) of the lens barrel 10, the motor (not shown) is driven, so that the cam ring 2 is rotated by a predetermined angle with respect to the linear movement guide ring 7 to the wide mode position. If the cam ring is rotated by, for example, 120 degrees, the protrusion of each engagement projection portion 20 interferes with the projection or flange of each groove portion 70 to serve as a stop, and accordance, no disengagement of the engagement projection portions 20 from the groove portions 70 of the linear movement guide ring 7 occurs, as shown in FIG. 24B.

Figure 23:
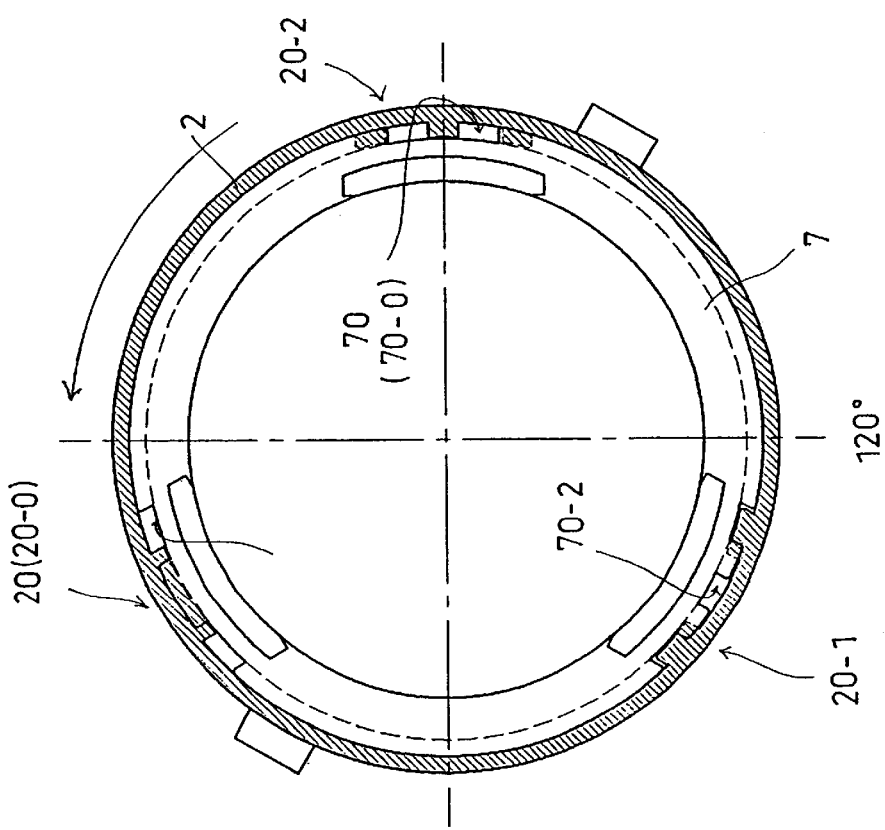
FIG. 23 is an explanatory view of an engagement structure when a relative phase difference between a cam ring and a linear movement guide ring is 240 degrees, according to a third embodiment of the present invention.
Figure 24:
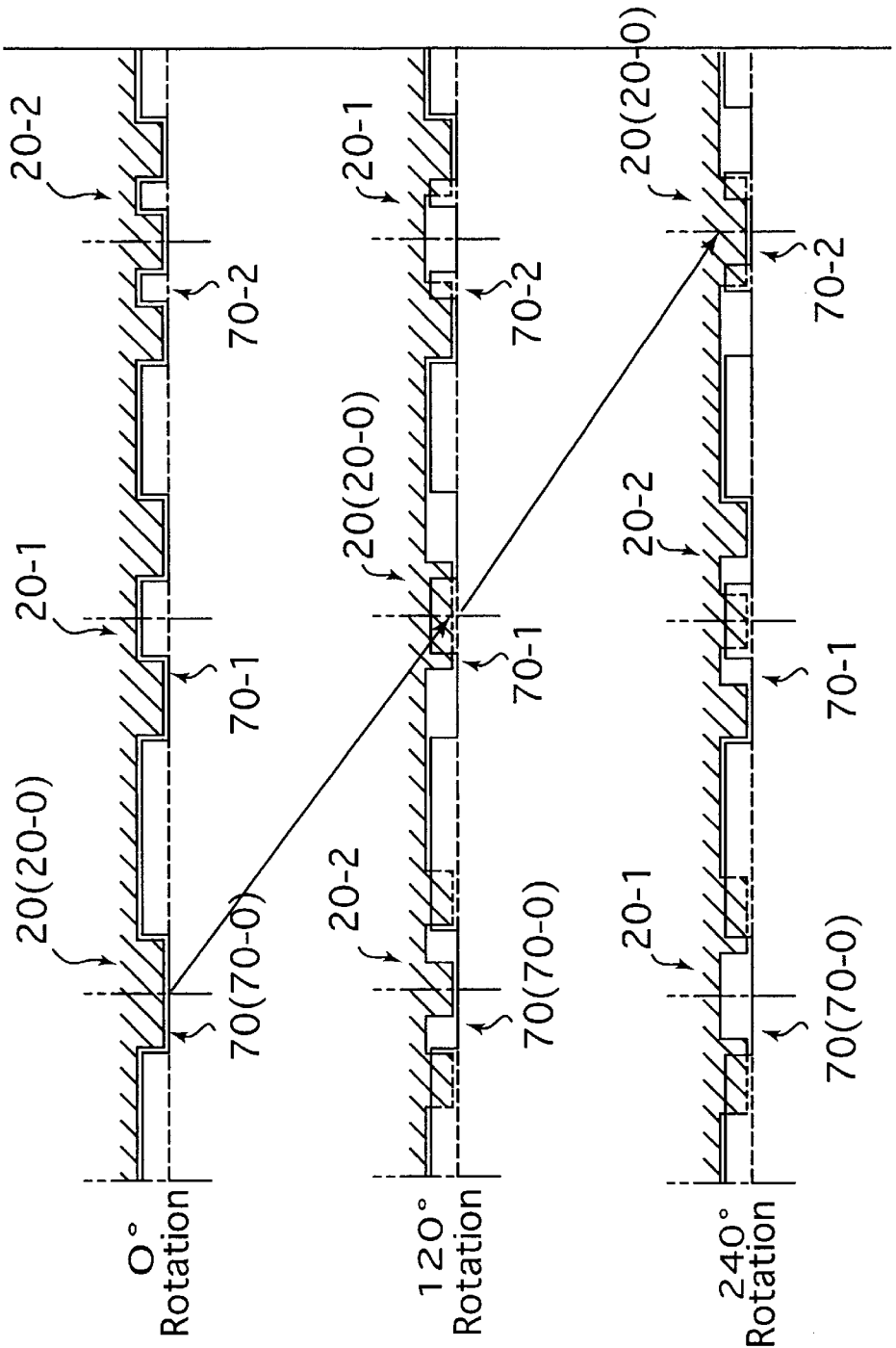
FIGS. 24A, 24B and 24C are explanatory views each showing a relationship between engagement projection portions of a cam ring and grooves of a linear movement guide ring, in a third embodiment of an engagement structure, at a relative phase difference of zero, 120 degrees, and 240 degrees, respectively.
Figure 25:
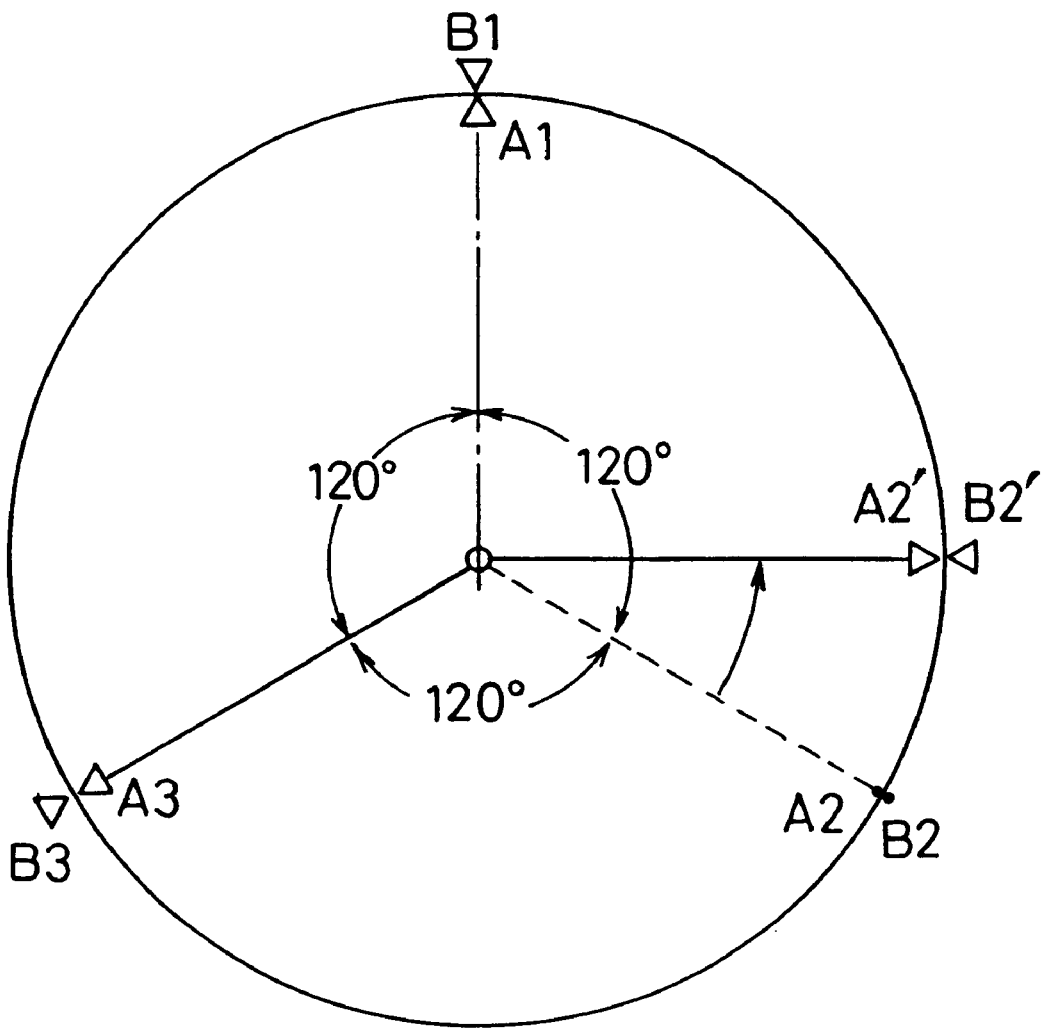
FIG. 25 is an explanatory view of a modification of a known engagement structure using engagement projection portions.

Likewise, during the angular displacement of the cam ring 2 with respect to the linear movement guide ring 7 by a predetermined angle (e.g., an angle approaching 360 degrees) to the telephoto mode position shown in FIG. 6, the engagement projection portions 20 overlap the protrusions of the groove portions 70 to serve as a stop, and accordingly, no disengagement of the engagement projection portions 20 from the groove portions 70 of the linear movement guide ring 7 occurs, as shown in FIGS. 23 and 24C.

As can be understood from the above-discussion, according to the present invention, even if there is no play in the radial direction, so that it is difficult to modify the projecting length of each projection in the radial direction, it is possible to provide a large angular displacement of the cylindrical members, and hence, not only can the cylindrical members be made small, but also the rotation can be performed stably, thus leading to achieving a high quality engagement structure.

Moreover, according to the present invention, if the width of the pairs of projection portions and groove portions for the cylindrical members is gradually increased in the circumferential direction, it is possible to easily assemble or disassemble the cylindrical members because the projection portions and the corresponding groove portions in which the projection portions are inserted can be easily visually confirmed.

Furthermore, according to the present invention, since the projection portions and the groove portions of the cylindrical members include a projection having no groove and a groove having no projection, it is possible to easily identify the portion at which the projection portions can be inserted in or removed from the groove portions, i.e., the portion at which the phase difference is zero, upon an assembling or disassembling operation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An engagement structure for cylindrical members comprising:
   a first cylindrical member including a plurality of engagement projection portions of different shapes having the same projecting length in the radial direction, each of said plurality of engagement projection portions having at least one projection, wherein at least one of said plurality of engagement projection portions includes at least one groove; and
   a second cylindrical member including a plurality of groove portions corresponding to the engagement projection portions, each said plurality of groove portions having at least one groove, wherein at least one of said plurality of groove portions includes at least one projection; wherein
   one of said first and second cylindrical members is accommodated inside the other of said first and second cylindrical members;
   the engagement projection portions and the corresponding groove portions can be engaged and disengaged only at one relative circumferential position of said first and second cylindrical members; and
   at a relative circumferential position other than said one relative circumferential position of said first and second cylindrical members, the engagement projection portions of said first cylindrical member are always engaged with at least a portion of the groove portions other than the grooves thereof.

2. The engagement structure for cylindrical members according to claim 1, wherein the overall lengths of the engagement projection portions in the circumferential direction are different from each other, and the overall lengths of the groove portions in the circumferential direction are different from each other.

3. The engagement structure for cylindrical members according to claim 2, wherein said engagement projection portions and said groove portions are formed so that the overall length in the circumferential direction of each engagement projection portion and groove portion is gradually increased.

4. The engagement structure for cylindrical members according to claim 2, wherein the at least one of said plurality of engagement projection portions includes two of said projections which are spaced by said groove in the circumferential direction; and wherein the at least one of said plurality of groove portions includes two of said grooves which are spaced by said projection in the circumferential direction.

5. The engagement structure for cylindrical members according to claim 2, wherein the grooves of said engagement projection portions have different circumferential lengths, and the projections of said groove portions have different circumferential lengths.

6. The engagement structure for cylindrical members according to claim 2, wherein the groove portions satisfy the following conditions:

$$A > B_j;$$

$$A > D_j;$$

$$A < E_j;$$

$$C_j < C_{j+1};$$

$$E_j < E_{j+1};$$

wherein

"A" designates the circumferential length of a groove portion having no projection;

$B_j$ and $D_j$ designate the circumferential lengths of the grooves of the j-th groove portion;

$C_j$ designates the circumferential length of the projection of the j-th groove portion; and $E_j$ designates the overall length of the j-th groove portion.

7. The engagement structure for cylindrical members according to claim 6, wherein the following conditions are satisfied:

$$B_j = B_{j+1}; \text{ and}$$

$$D_j = D_{j+1}.$$

8. The engagement structure for cylindrical members according to claim 6, wherein the following condition is satisfied:

$$B_j = D_j.$$

9. The engagement structure for cylindrical members according to claim 2, wherein the engagement projection portions satisfy the following conditions:

$$A > B_j;$$

$$A > D_j;$$

$$A < E_j;$$

$$C_j < C_{j+1};$$

$$E_j < E_{j+1};$$

wherein

"A" designates the circumferential length of an engagement projection portion having no groove;

$B_j$ and $D_j$ designate the circumferential lengths of the projections of the j-th engagement projection portion;

$C_j$ designates the circumferential length of the groove of the j-th engagement projection portion; and $E_j$ designates the overall length of the j-th engagement projection portion.

10. The engagement structure for cylindrical members according to claim 9, wherein the following conditions are satisfied:

$$B_j = B_{j+1}; \text{ and}$$

$$D_j = D_{j+1}.$$

11. The engagement structure for cylindrical members according to claim 9, wherein the following condition is satisfied:

$$B_j = D_j.$$

12. The engagement structure for cylindrical members according to claim 2, wherein one of said cylindrical members is a cam ring which is adapted to move a lens barrel of a camera, and the other cylindrical member is a linear movement guide ring which is adapted to guide a linear movement of a lens support cylinder which is rotatably supported by the cam ring and is moved linearly in an optical axis direction in accordance with the rotation of the cam ring.

13. The engagement structure for cylindrical members according to claim 1, wherein the grooves of the respective engagement projection portions are located at different circumferential positions along the circumferential lengths of the respective engagement projection portions.

14. The engagement structure for cylindrical members according to claim 13, wherein the following condition is satisfied:

$$E_j = E_{j+1};$$

wherein $E_j$ designates one of the overall length of the j-th groove portion and the overall length of the j-th engagement projection portion.

15. The engagement structure for cylindrical members according to claim 13, wherein the groove portions satisfy the following conditions:

$$A > B_j;$$

$$A > D_j;$$

$$A < E_j;$$

$$A < E_j; \text{ and}$$

$$B_j < B_{j+1};$$

wherein

"A" designates the circumferential length of a groove portion having no projection;

$B_j$ designates the circumferential length of a first groove of the j-th groove portion;

$D_j$ designates the circumferential length of a second groove of the j-th groove portion; and $E_j$ designates the overall length of the j-th groove portion.

16. The engagement structure for cylindrical members according to claim 15, wherein the following condition is satisfied:

$$E_j = E_{j+1}.$$

17. The engagement structure for cylindrical members according to claim 15, wherein the following condition is satisfied:

$$C_j = C_{j+1};$$

wherein $C_j$ designates the circumferential length of the projection of the j-th groove portion.

18. The engagement structure for cylindrical members according to claim 13, wherein the engagement projection portions satisfy the following conditions:

$$A > B_j;$$

$$A > D_j;$$

$$A < E_j;$$

$$A < E_j; \text{ and}$$

$$B_j < B_{j+1};$$

wherein

"A" designates the circumferential length of an engagement projection portion having no groove;

$B_j$ designates the circumferential length of a first projection of the j-th engagement projection portion;

$D_j$ designates the circumferential length of a second projection of the j-th engagement projection portion; and $E_j$ designates the overall length of the j-th engagement projection portion.

19. The engagement structure for cylindrical members according to claim 18, wherein the following condition is satisfied:

$$E_j = E_{j+1}.$$

20. The engagement structure for cylindrical members according to claim 18, wherein the following condition is satisfied:

$$C_j = C_{j+1};$$

wherein $C_j$ designates the circumferential length of the groove of the j-th engagement projection portion.

21. The engagement structure for cylindrical members according to claim 13, wherein one of the cylindrical members is a cam ring which is adapted to move a lens barrel of a camera, and the other cylindrical member is a lens support cylinder which is rotatably supported by the cam ring and is moved linearly in an optical axis direction in accordance with the rotation of the cam ring.

22. The engagement structure for cylindrical members according to claim 1, wherein the engagement projection portions have different numbers of grooves.

23. The engagement structure for cylindrical members according to claim 22, wherein the following condition is satisfied:

$$E_j \neq E_{j+1};$$

wherein $E_j$ designates one of the overall length of the j-th groove portion and the overall length of the j-th engagement projection portion.

24. The engagement structure for cylindrical members according to claim 22, wherein the projections of the groove portions have different circumferential lengths.

25. The engagement structure for cylindrical members according to claim 22, wherein the grooves of the engagement projection portions have different circumferential lengths.

26. The engagement structure for cylindrical members according to claim 22, wherein the engagement projection portions and the groove portions of the cylindrical members are arranged so that the overall lengths thereof in the circumferential direction gradually increase.

27. The engagement structure for cylindrical members according to claim 22, wherein the following conditions are satisfied:

$$A > B_{j,k}; \text{ and}$$

$$B_{j,k} > B_{j+1,k};$$

wherein

"A" designates the circumferential length of a groove portion having no projection; and $B_{j,k}$ designates the circumferential length of a k-th groove of a j-th groove portion.

28. The engagement structure for cylindrical members according to claim 22, wherein the following conditions are satisfied:

$$A > B_{j,k}; \text{and}$$

$$B_{j,k} > B_{j+1,k};$$

wherein

"A" designates the circumferential length of an engagement projection portion having no groove; and $B_{j,k}$ designates the circumferential length of a k-th projection of a j-th engagement projection portion.

29. The engagement structure for cylindrical members according to claim 22, wherein the following condition is satisfied:

$$B_{j,k} = B_{j,k+1};$$

wherein $B_{j,k}$ designates one of the circumferential length of a k-th groove of a j-th groove portion and the circumferential length of a k-th projection of a j-th engagement projection portion.

30. The engagement structure for cylindrical members according to claim 22, wherein the following condition is satisfied:

$$C_{j,k} > C_{j+1,k};$$

wherein $C_{j,k}$ designates the circumferential length of the projection provided between the k-th and (k+1)-th grooves of the j-th groove portion.

31. The engagement structure for cylindrical members according to claim 22, wherein the following condition is satisfied:

$$C_{j,k} > C_{j+1,k};$$

wherein $C_{j,k}$ designates the circumferential length of the groove provided between the k-th and (k+1)-th projection of the j-th engagement projection portion.

32. The engagement structure for cylindrical members according to claim 22, wherein one of the cylindrical members is a cam ring which is adapted to move a lens barrel of a camera, and the other cylindrical member is a lens support cylinder which is rotatably supported by the cam ring and is moved linearly in an optical axis direction in accordance with the rotation of the cam ring.

* * * * *